US011409279B1

(12) United States Patent
Solenberg et al.

(10) Patent No.: US 11,409,279 B1
(45) Date of Patent: Aug. 9, 2022

(54) AUTONOMOUSLY MOTILE DEVICE WITH REMOTE CONTROL

(71) Applicant: Amazon Technologies, Inc., Seattle, WA (US)

(72) Inventors: Amy Solenberg, San Francisco, CA (US); Anil Kumar Katta, Bellevue, WA (US); Swati S Rao, Sunnyvale, CA (US); Swetha Bijoy, Bothell, WA (US); Anthony George Robson, Los Altos, CA (US); David Allen Fotland, San Jose, CA (US); Robert Franklin Ebert, Los Altos Hills, CA (US); Roger Robert Webster, Los Altos, CA (US); Adam Fineberg, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/584,066

(22) Filed: Sep. 26, 2019

(51) Int. Cl.
*G05D 1/00* (2006.01)
*G06F 3/0488* (2022.01)
*H04N 7/18* (2006.01)

(52) U.S. Cl.
CPC ......... *G05D 1/0038* (2013.01); *G05D 1/0088* (2013.01); *G06F 3/0488* (2013.01); *H04N 7/185* (2013.01)

(58) Field of Classification Search
CPC .. G05D 1/0038; G05D 1/0088; G06F 3/0488; H04N 7/185
USPC ............................................................ 701/2
See application file for complete search history.

(56) References Cited

U.S. PATENT DOCUMENTS

| 9,176,749 | B2 * | 11/2015 | Kim | H04M 1/724 |
| 10,055,050 | B2 * | 8/2018 | Koike | G06F 3/04886 |
| 11,036,384 | B2 * | 6/2021 | Yoon | G06F 3/0488 |
| 2009/0184935 | A1 * | 7/2009 | Kim | G06F 3/0416 345/173 |
| 2011/0285645 | A1 * | 11/2011 | Cho | G06F 3/041661 345/173 |

(Continued)

FOREIGN PATENT DOCUMENTS

| EP | 2631766 A2 * | 8/2013 | ......... G06F 3/04883 |
| EP | 3073363 A1 * | 9/2016 | ........... G06F 3/0416 |

(Continued)

OTHER PUBLICATIONS

Makio et al., "Calibrating Screen Coordinates of Tabletop Display Using a Shadow Cursor and Its Properties," 2016, Publisher: IEEE.*

(Continued)

*Primary Examiner* — Tuan C To
(74) *Attorney, Agent, or Firm* — Pierce Atwood LLP

(57) ABSTRACT

Movement of an autonomously motile device may be controlled by a user device. The user device may display image data captured by a camera of the autonomously motile device; a user may provide input, such as a touch gesture on a display screen, indicating a command for the autonomously motile device to move to a location indicated by the input. The autonomously motile device determines a coordinate of the input and a time of the touch input; the autonomously motile device then determines a direction and distance of a corresponding movement.

20 Claims, 36 Drawing Sheets

(56) References Cited

U.S. PATENT DOCUMENTS

| | | | |
|---|---|---|---|
| 2012/0242617 A1* | 9/2012 | Lee | G06F 3/0418 345/174 |
| 2013/0141373 A1* | 6/2013 | Takuma | G06F 3/0488 345/173 |
| 2013/0234982 A1* | 9/2013 | Kang | G06F 3/0488 345/174 |
| 2014/0300559 A1* | 10/2014 | Tanimoto | G06F 3/0484 345/173 |
| 2016/0062545 A1* | 3/2016 | Lai | G06F 3/04886 345/174 |
| 2018/0032195 A1* | 2/2018 | Lee | G06F 3/0488 |
| 2021/0333922 A1* | 10/2021 | Fang | G06F 3/0446 |

FOREIGN PATENT DOCUMENTS

| | | | | |
|---|---|---|---|---|
| WO | WO-2018026164 A1 * | 2/2018 | | G06F 3/0412 |
| WO | WO-2018076384 A1 * | 5/2018 | | G06F 3/0488 |

OTHER PUBLICATIONS

Seungbae et al., "Two-Dimensional Position Detection System with MEMS Accelerometers, Readout Circuitry, and Microprocessor for Padless Mouse Applications," 2005, vol. 13, Publisher: IEEE.*
Chen et al., "Common Field-of-View of Cameras in Robotic Swarms," 2013, Publisher: IEEE.*

* cited by examiner

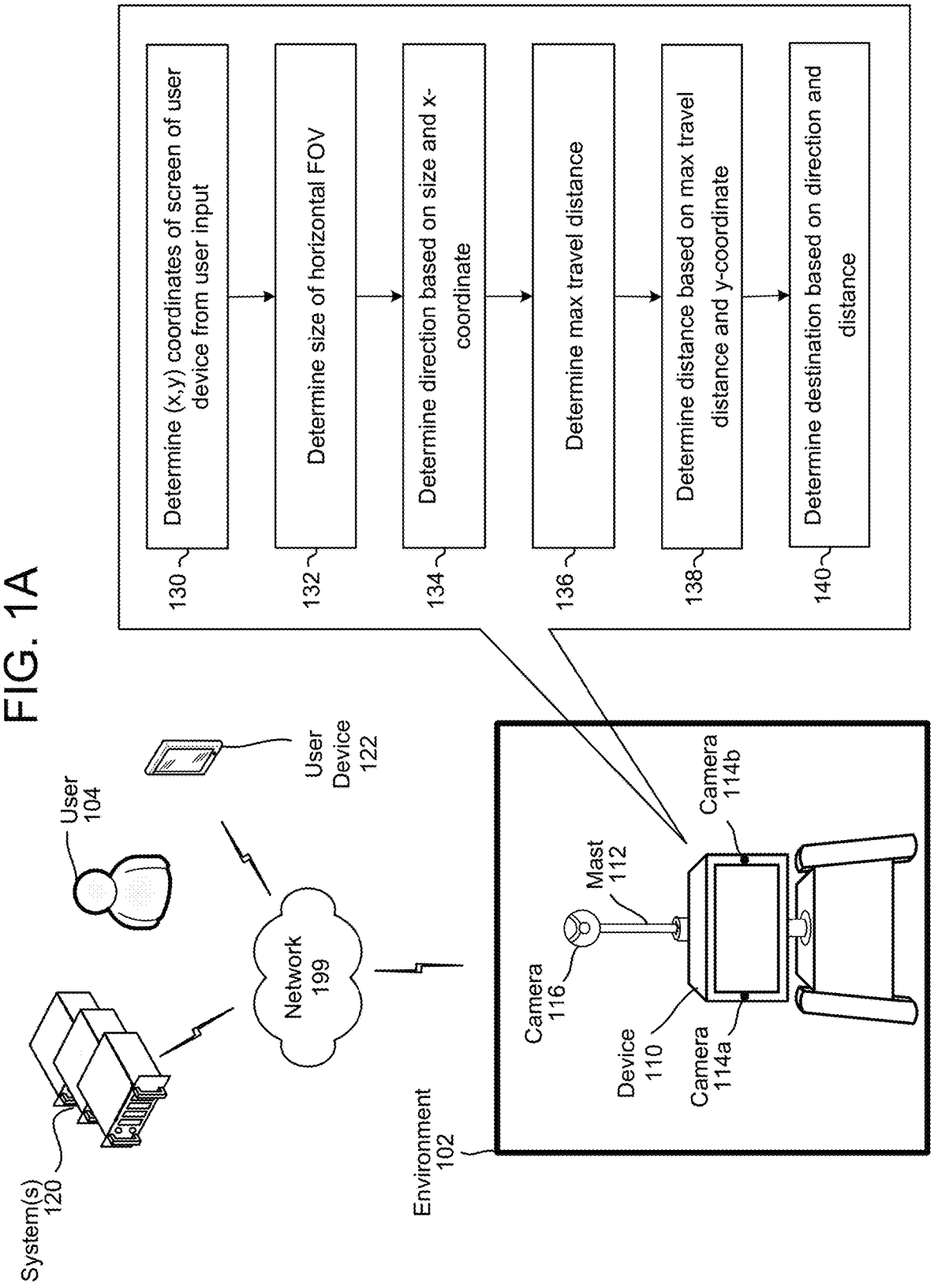

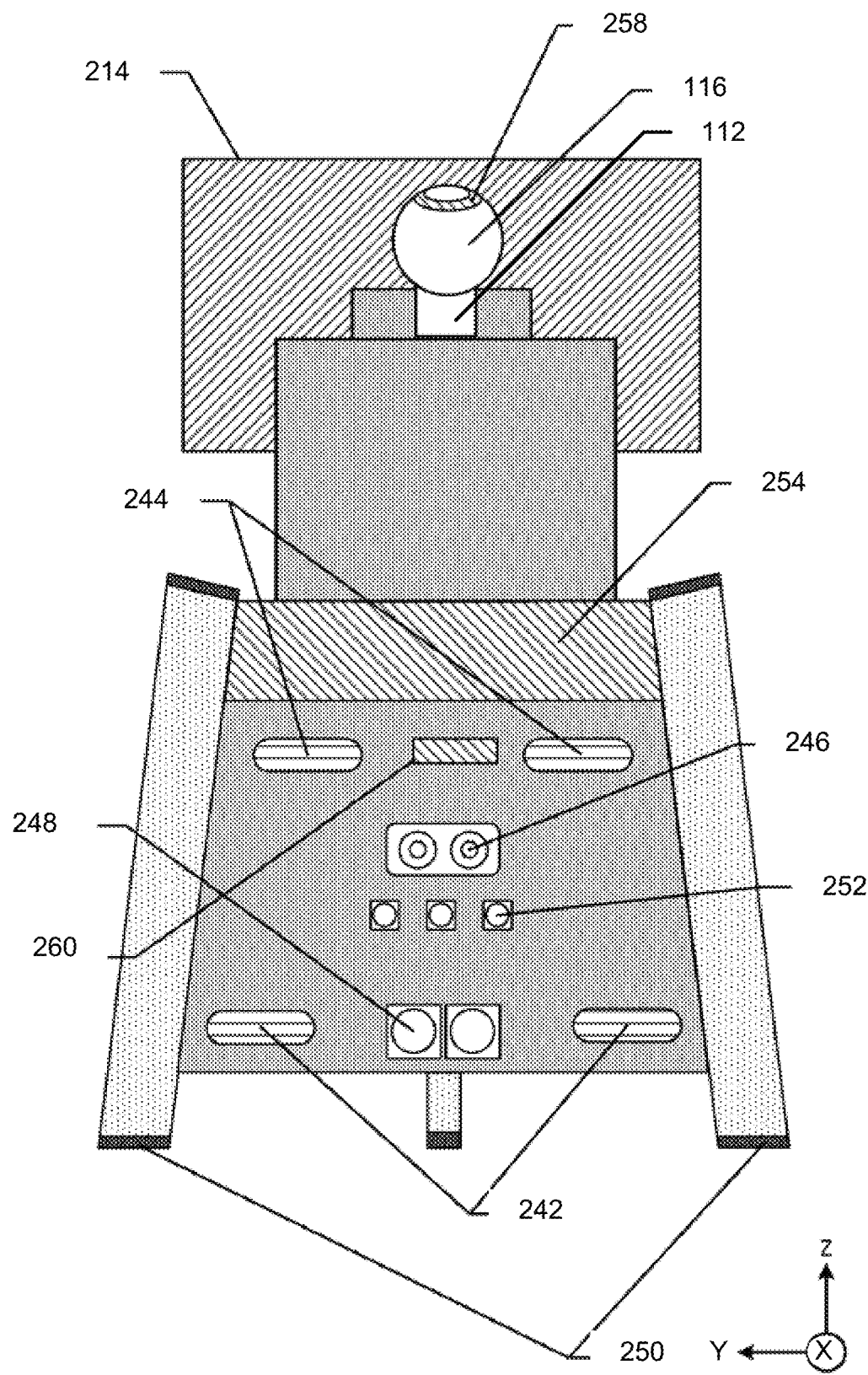

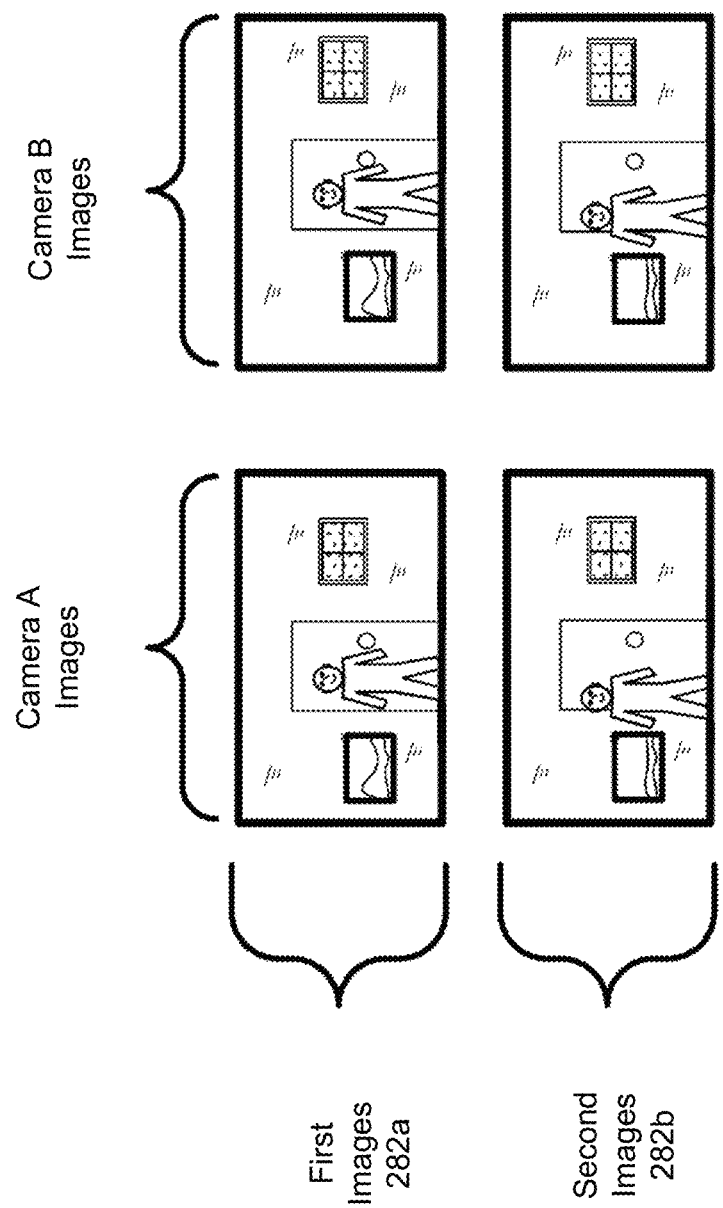

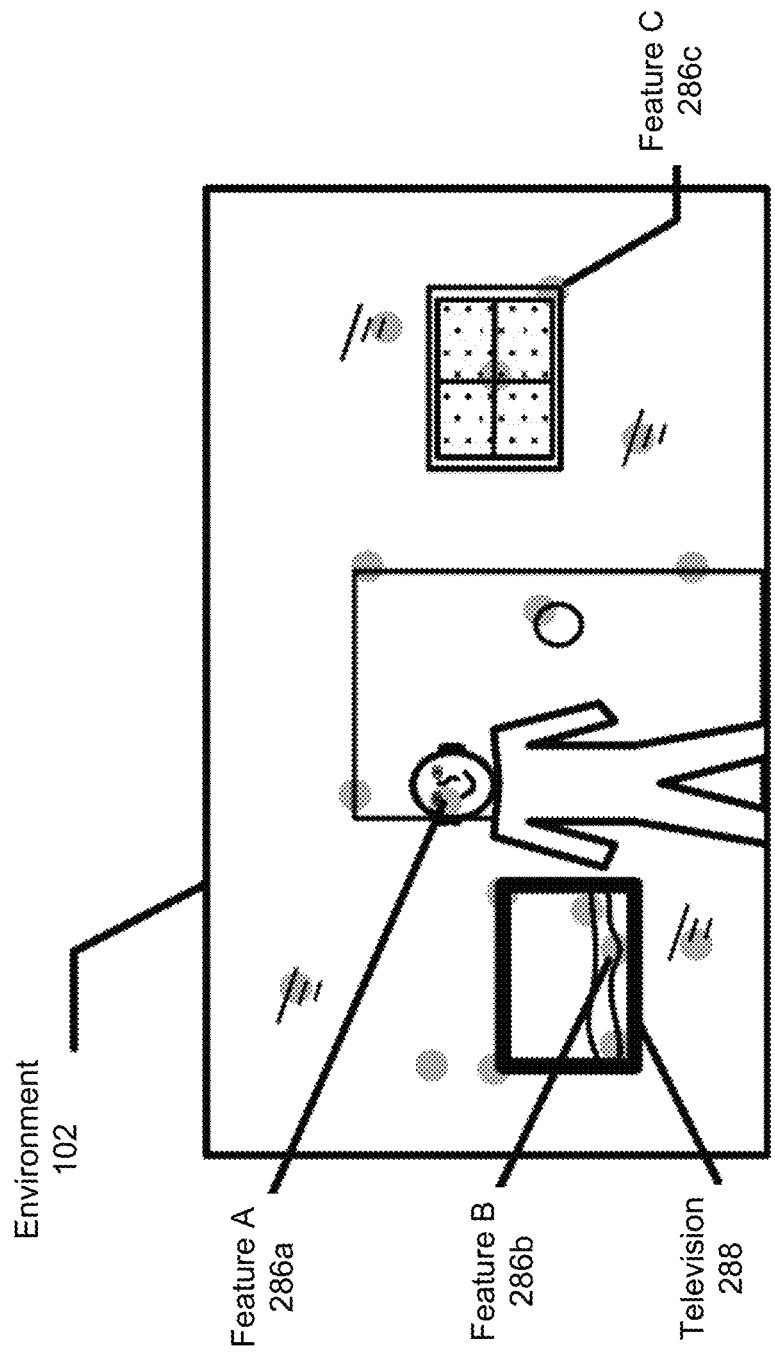

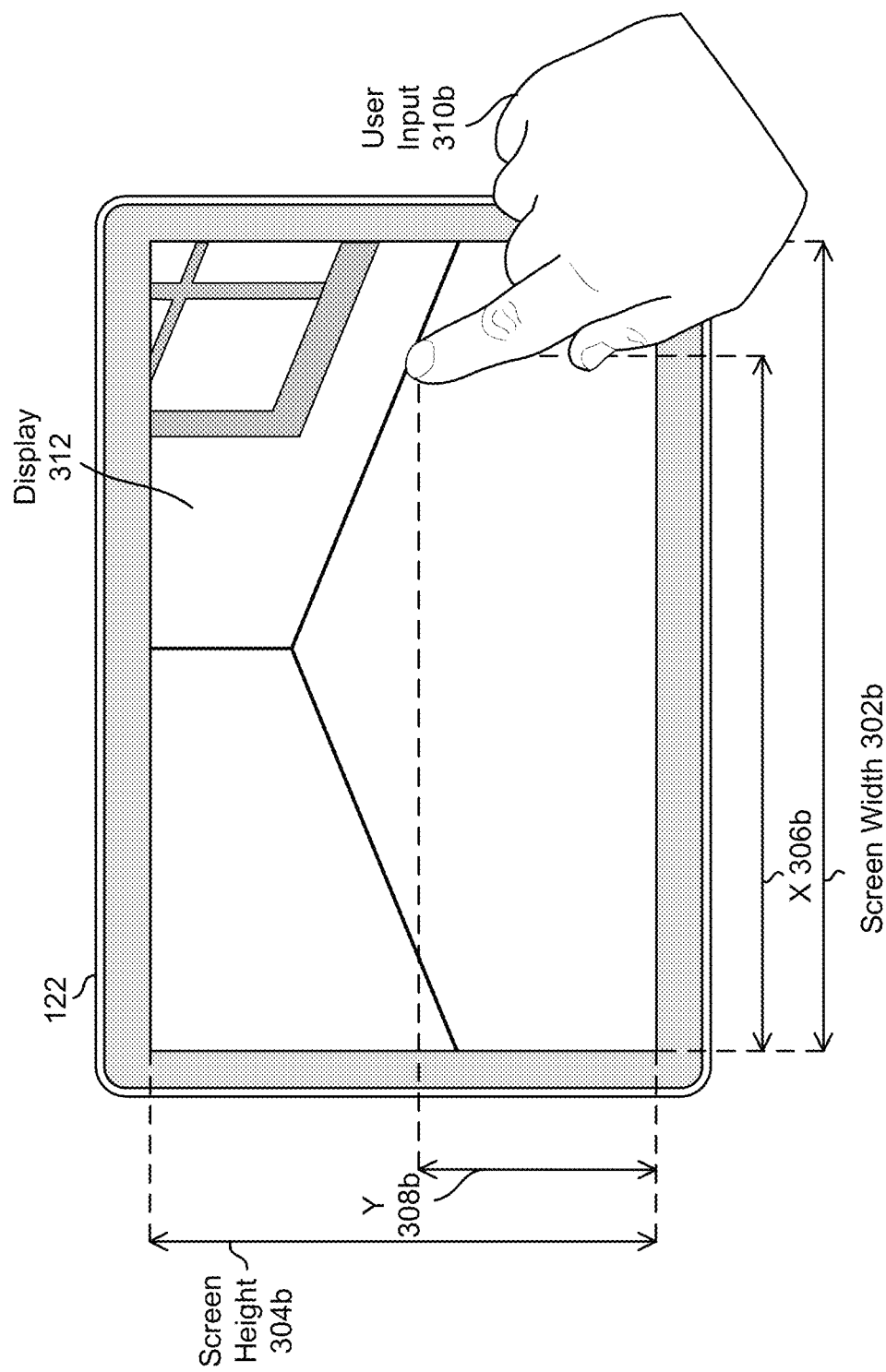

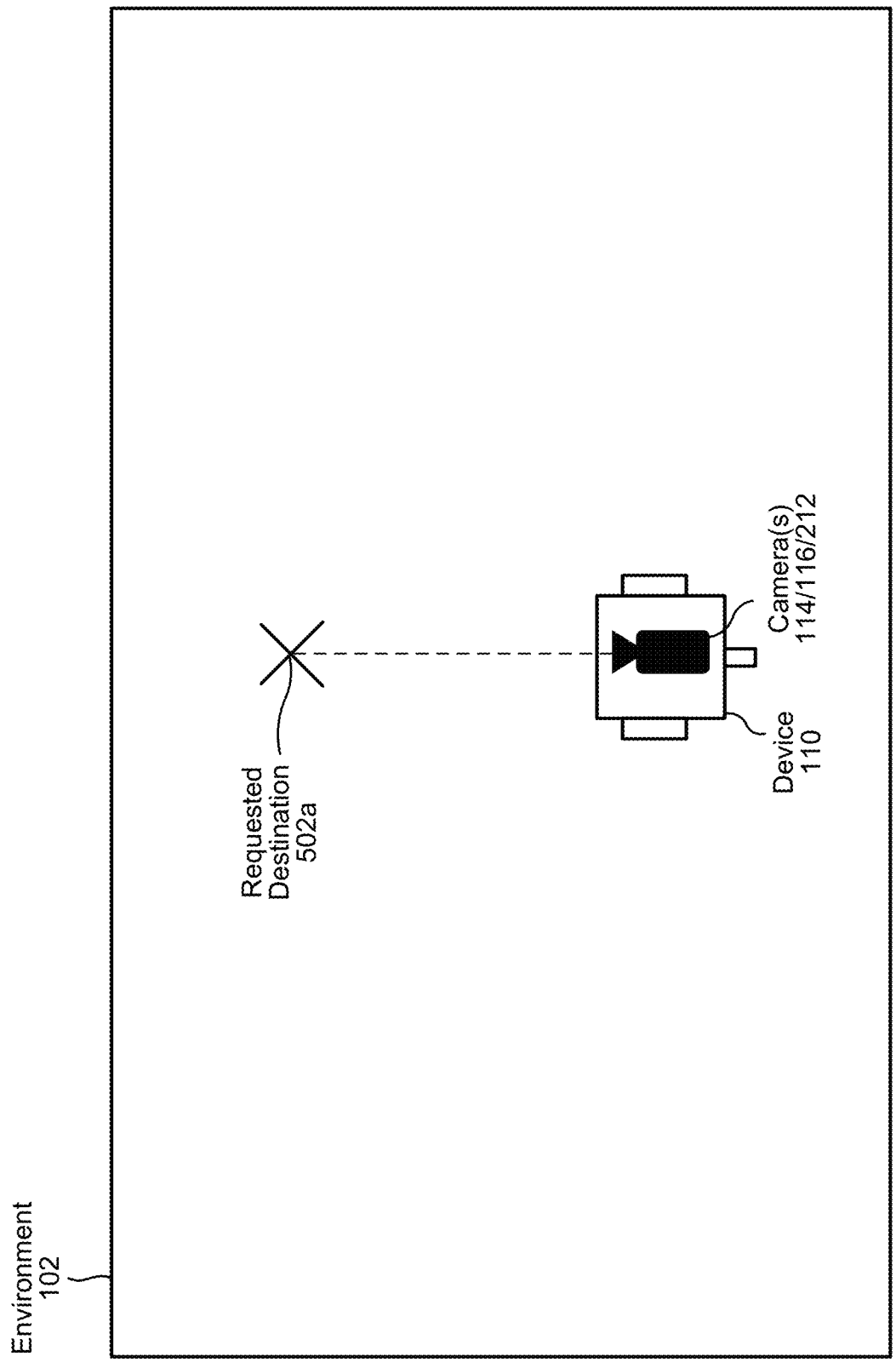

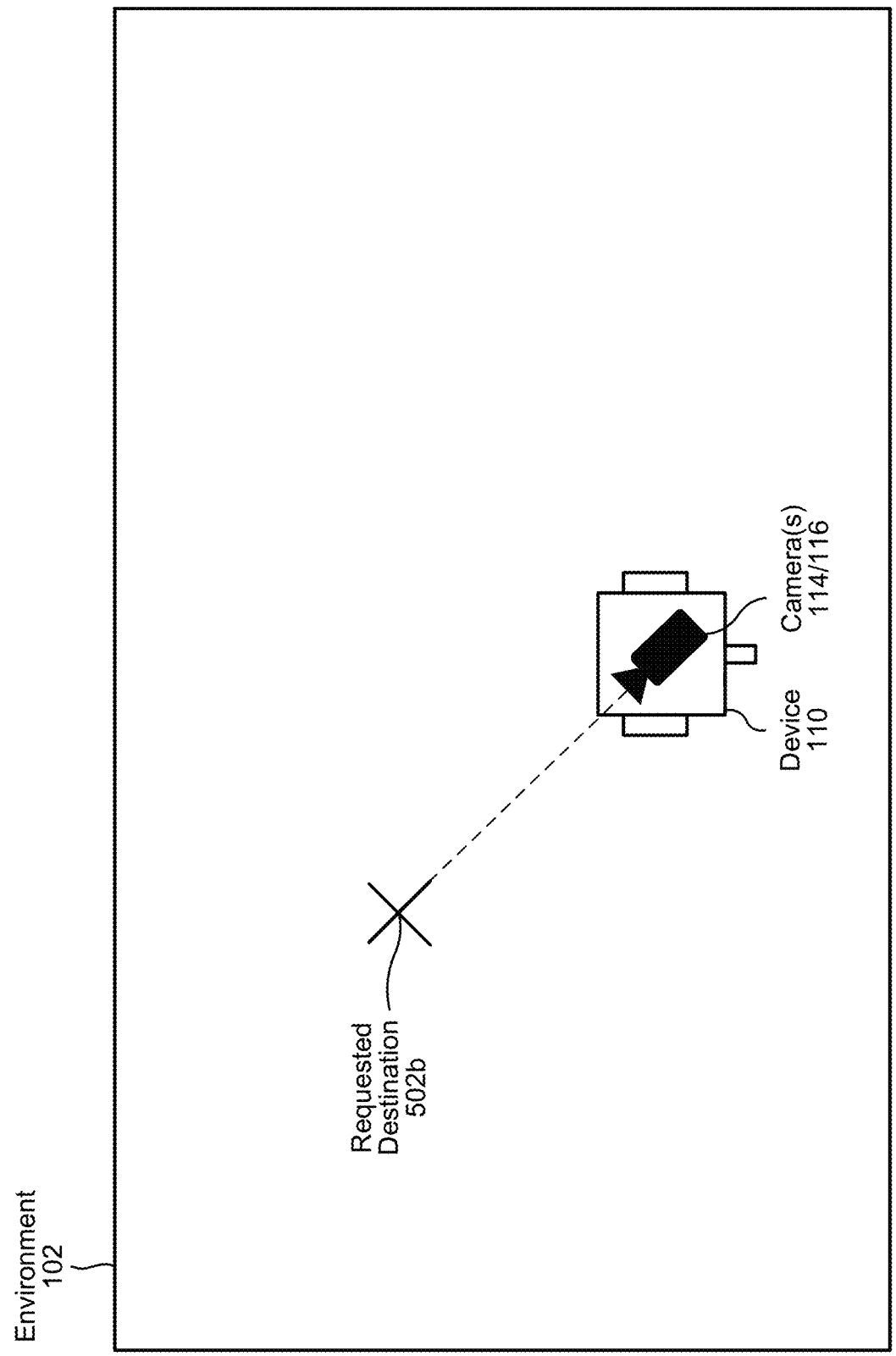

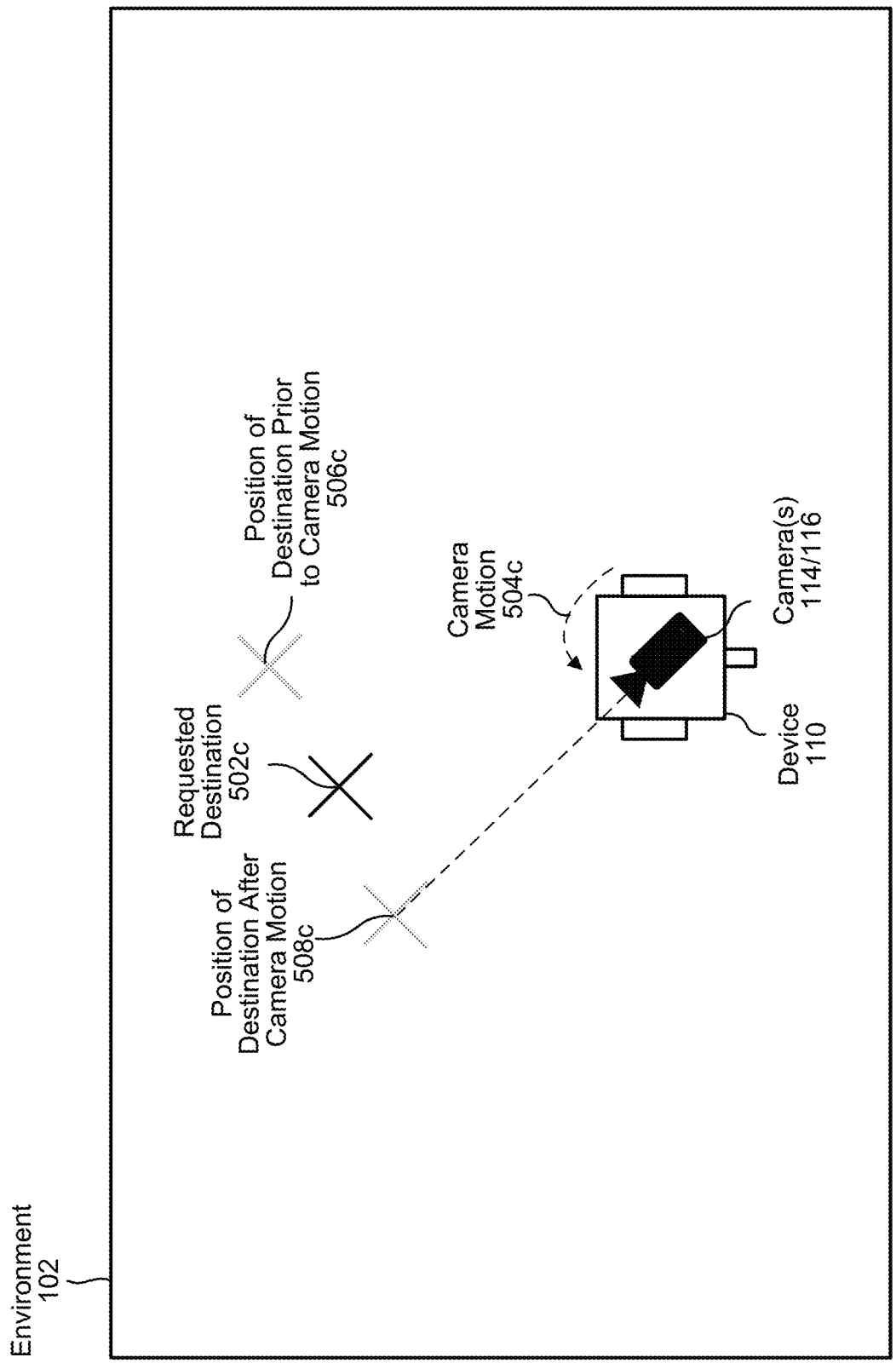

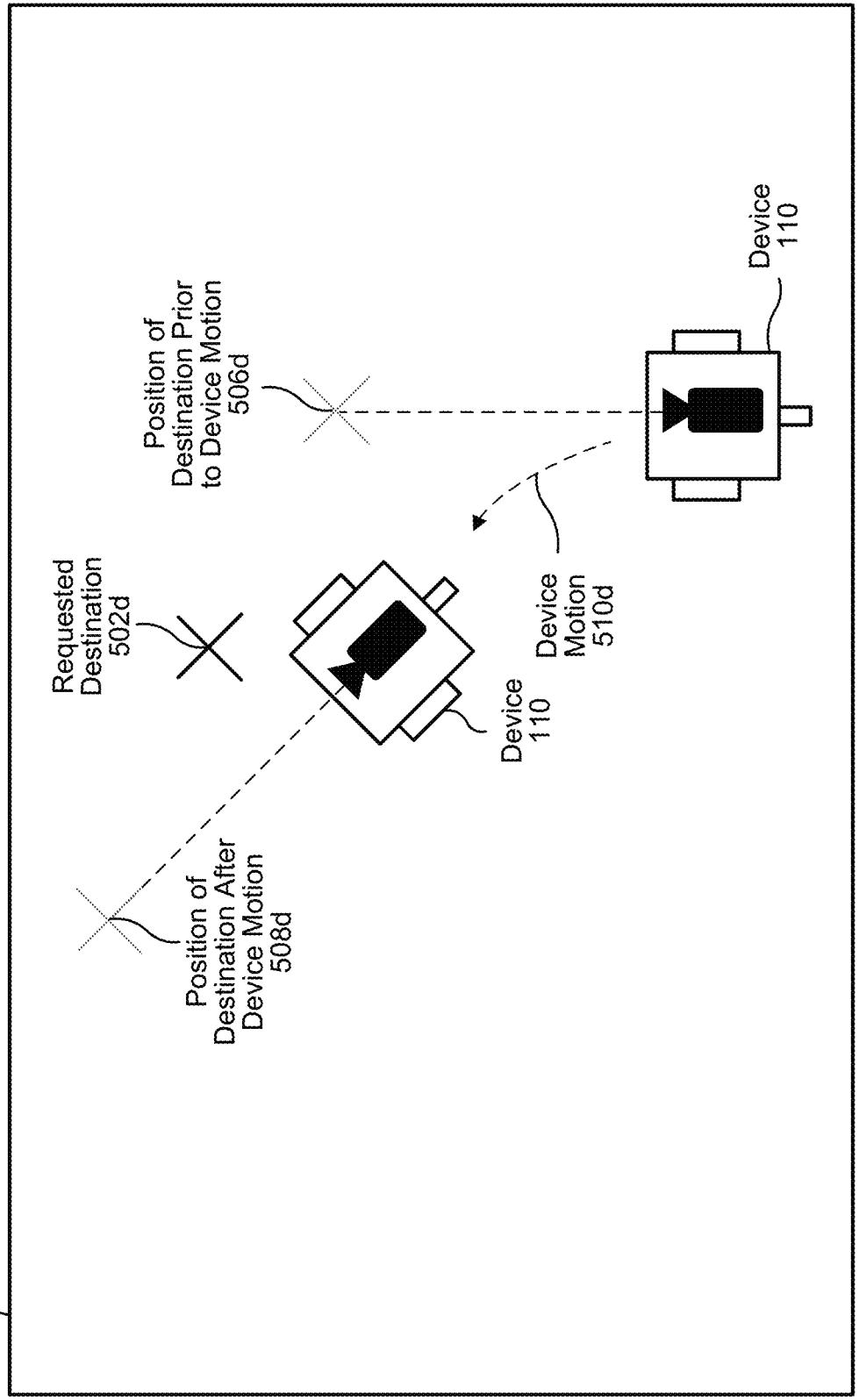

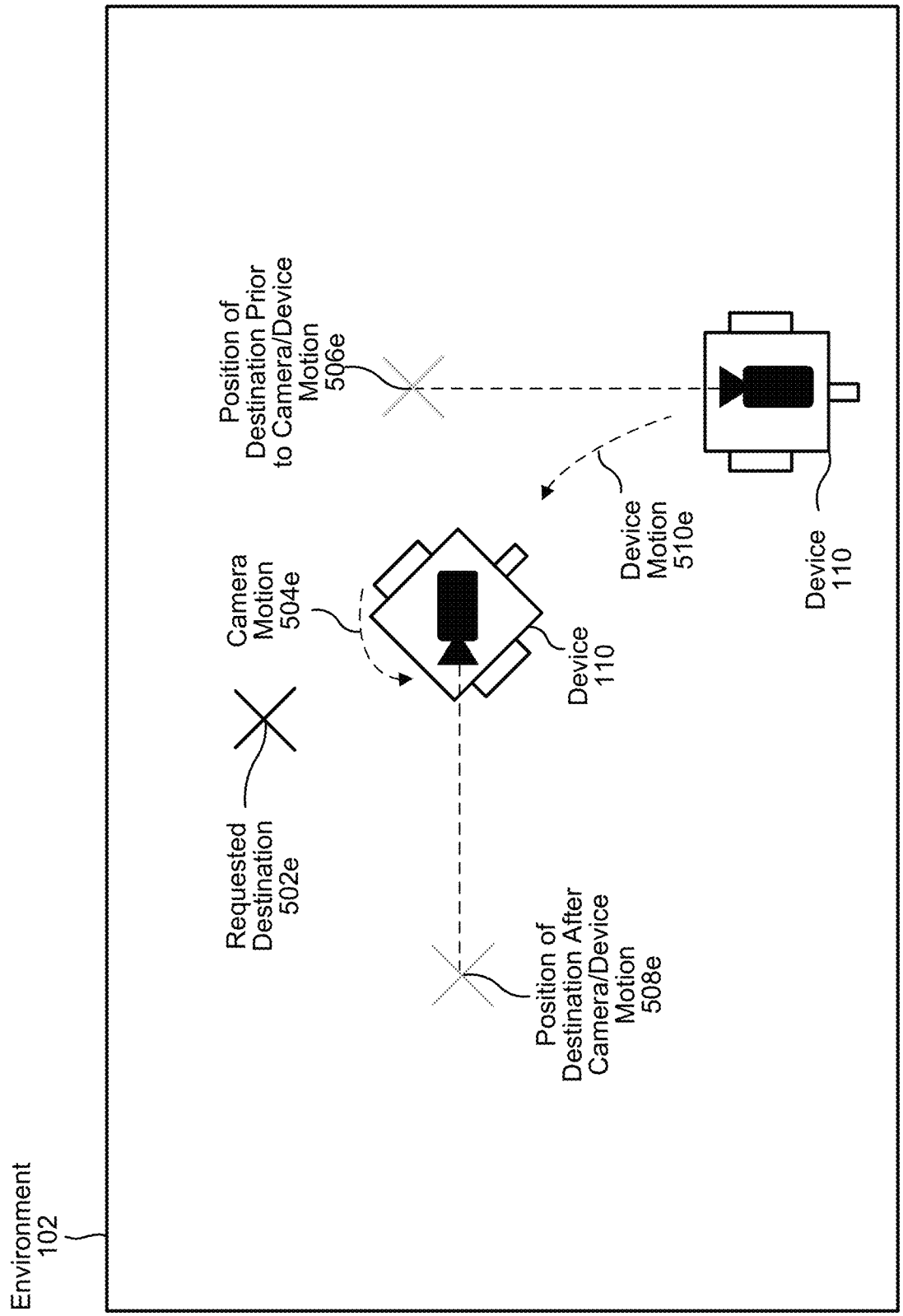

FIG. 6

| Time/Frame | Device Position | | | | Camera 1 | | | Camera(s) Orientation Camera 2 | | |
|---|---|---|---|---|---|---|---|---|---|---|
| | x | y | z | orientation | pan | tilt | pedestal | pan | tilt | pedestal |
| 1 | $x_1$ | $y_1$ | $z_1$ | $angle_1$ | $angle_1$ | $angle_1$ | $height_1$ | $angle_1$ | $angle_1$ | $height_1$ |
| 2 | $x_2$ | $y_2$ | $z_2$ | $angle_2$ | $angle_2$ | $angle_2$ | $height_2$ | $angle_2$ | $angle_2$ | $height_2$ |
| ... | ... | ... | ... | ... | ... | ... | ... | ... | ... | ... |
| n | $x_n$ | $y_n$ | $z_n$ | $angle_n$ | $angle_n$ | $angle_n$ | $height_n$ | $angle_n$ | $angle_n$ | $height_n$ |

600

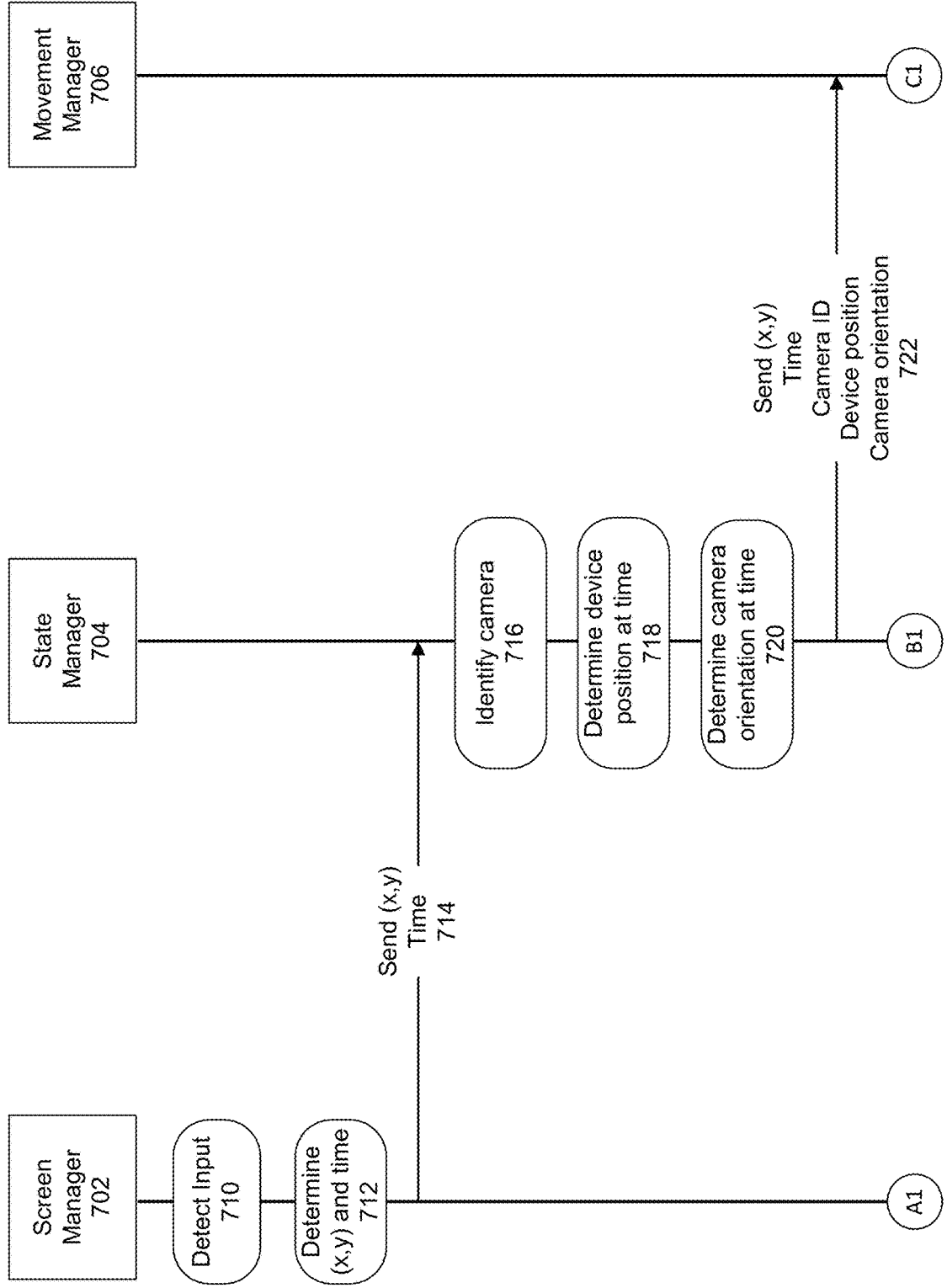

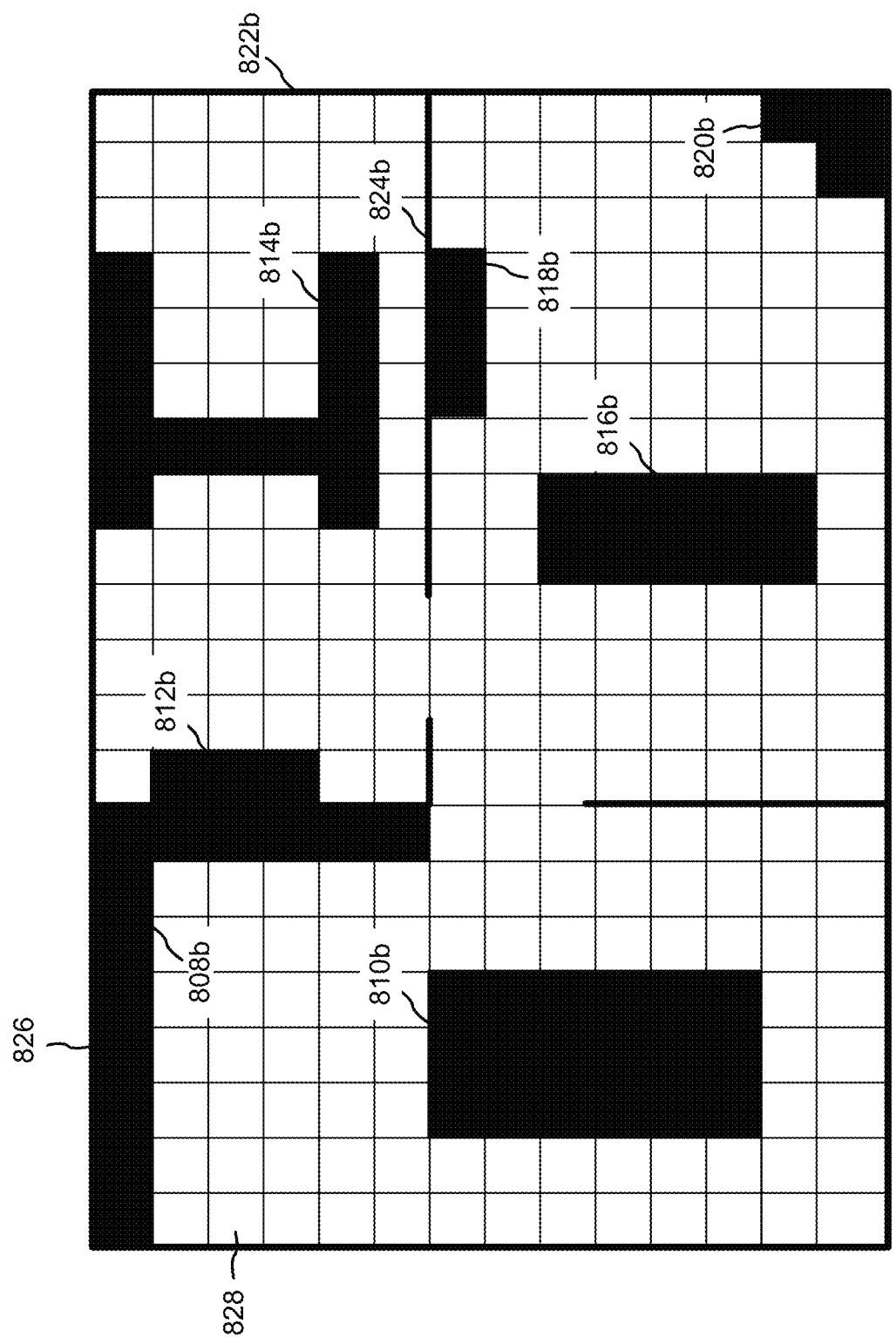

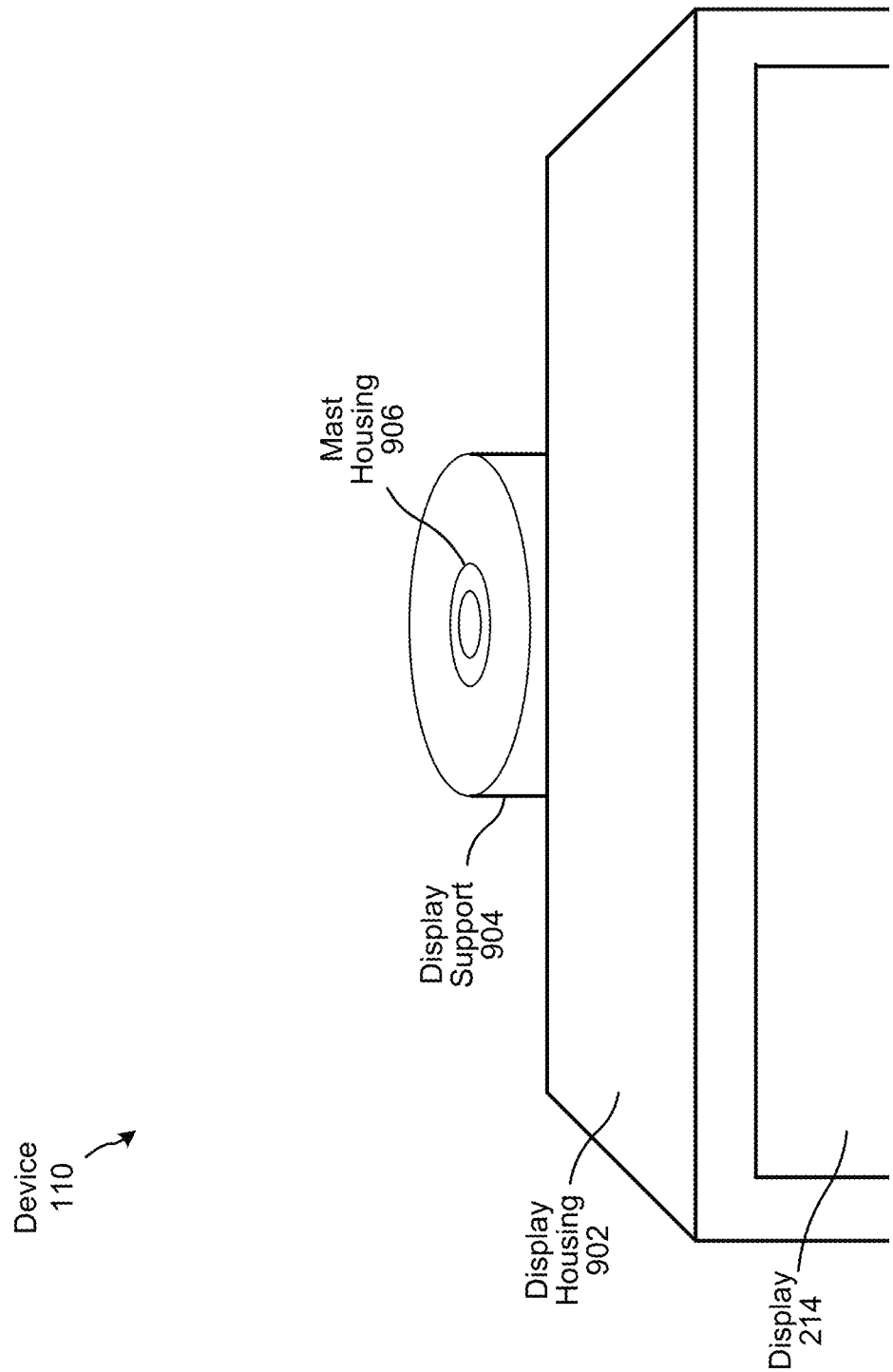

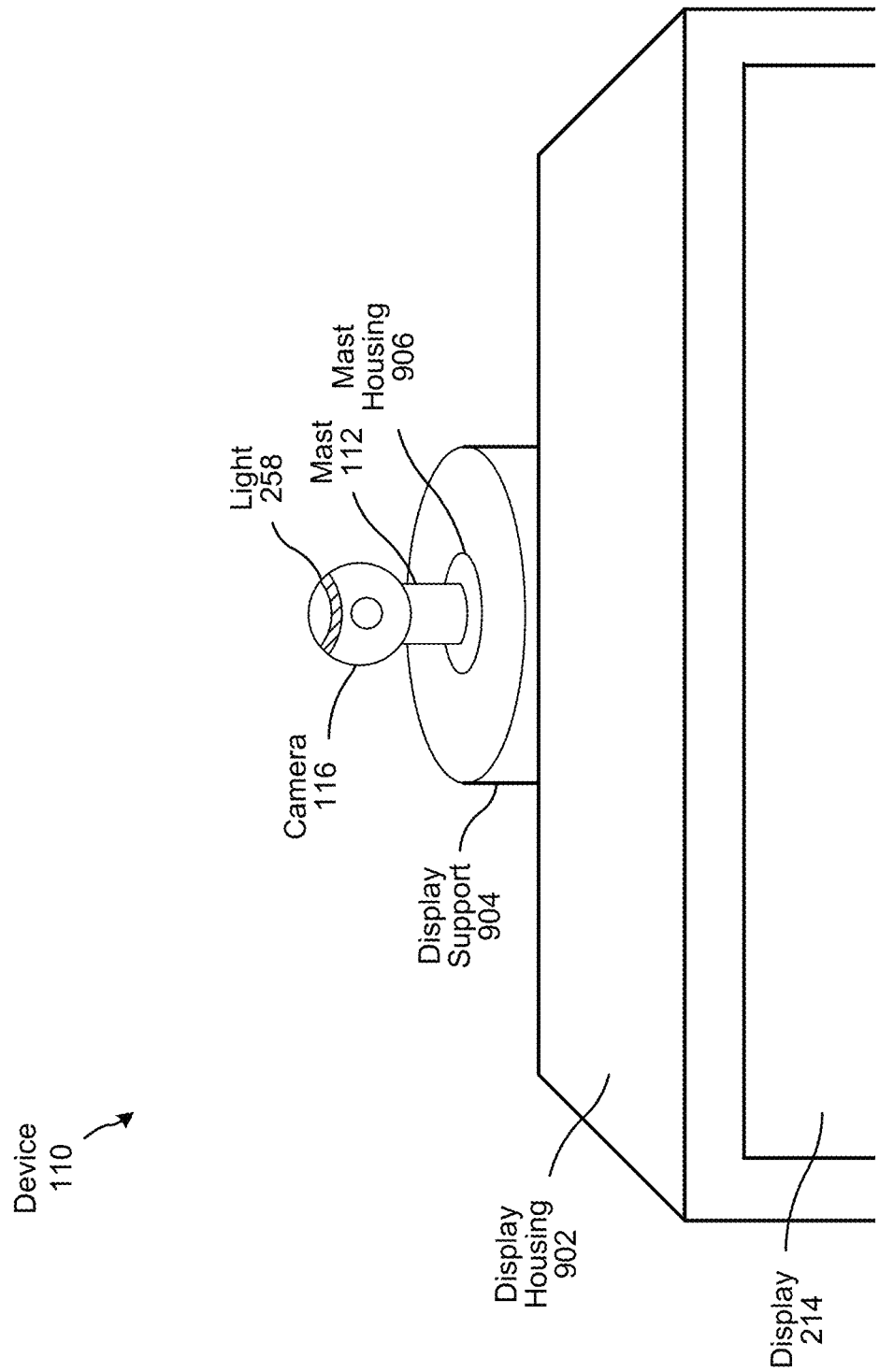

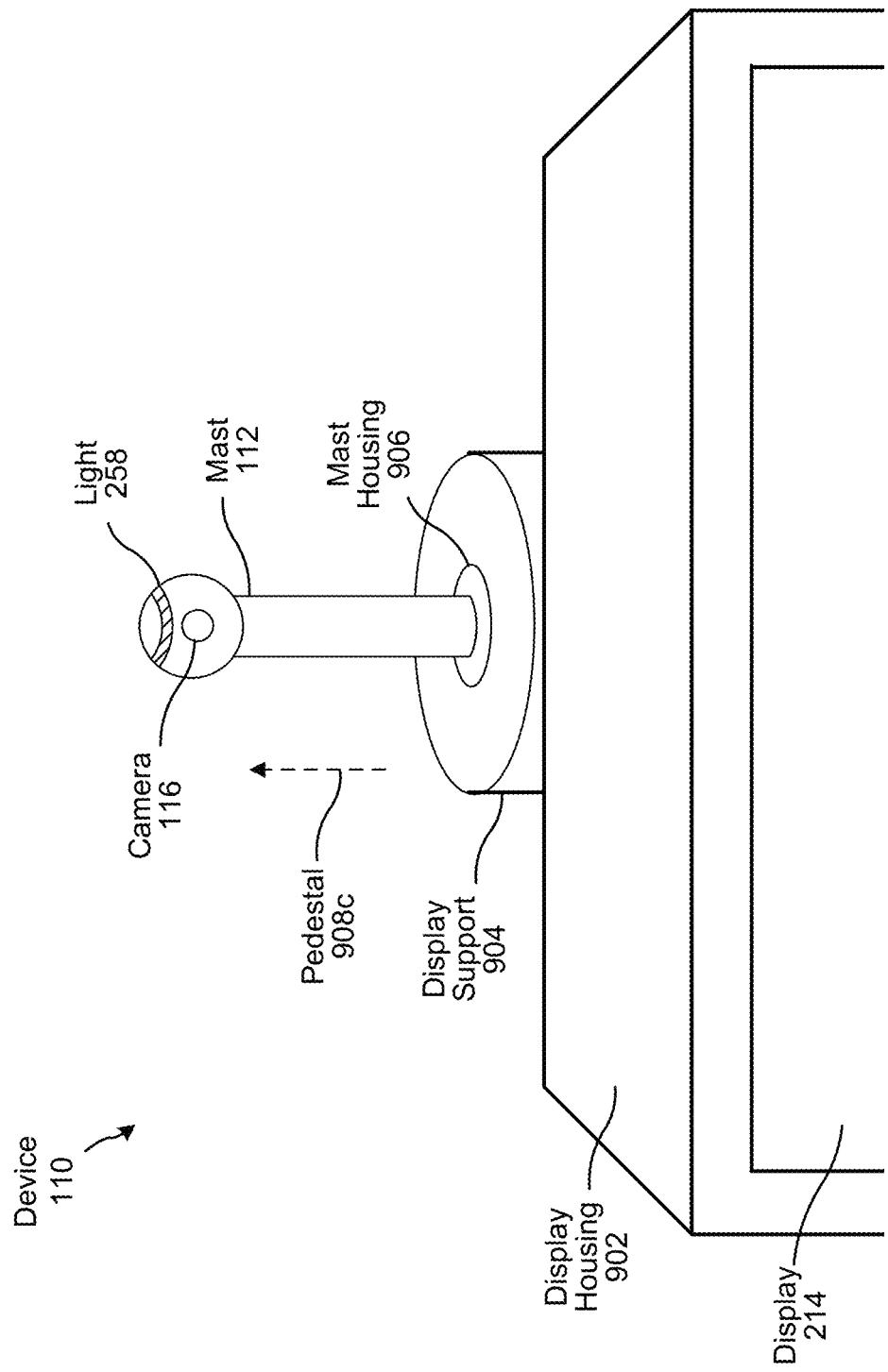

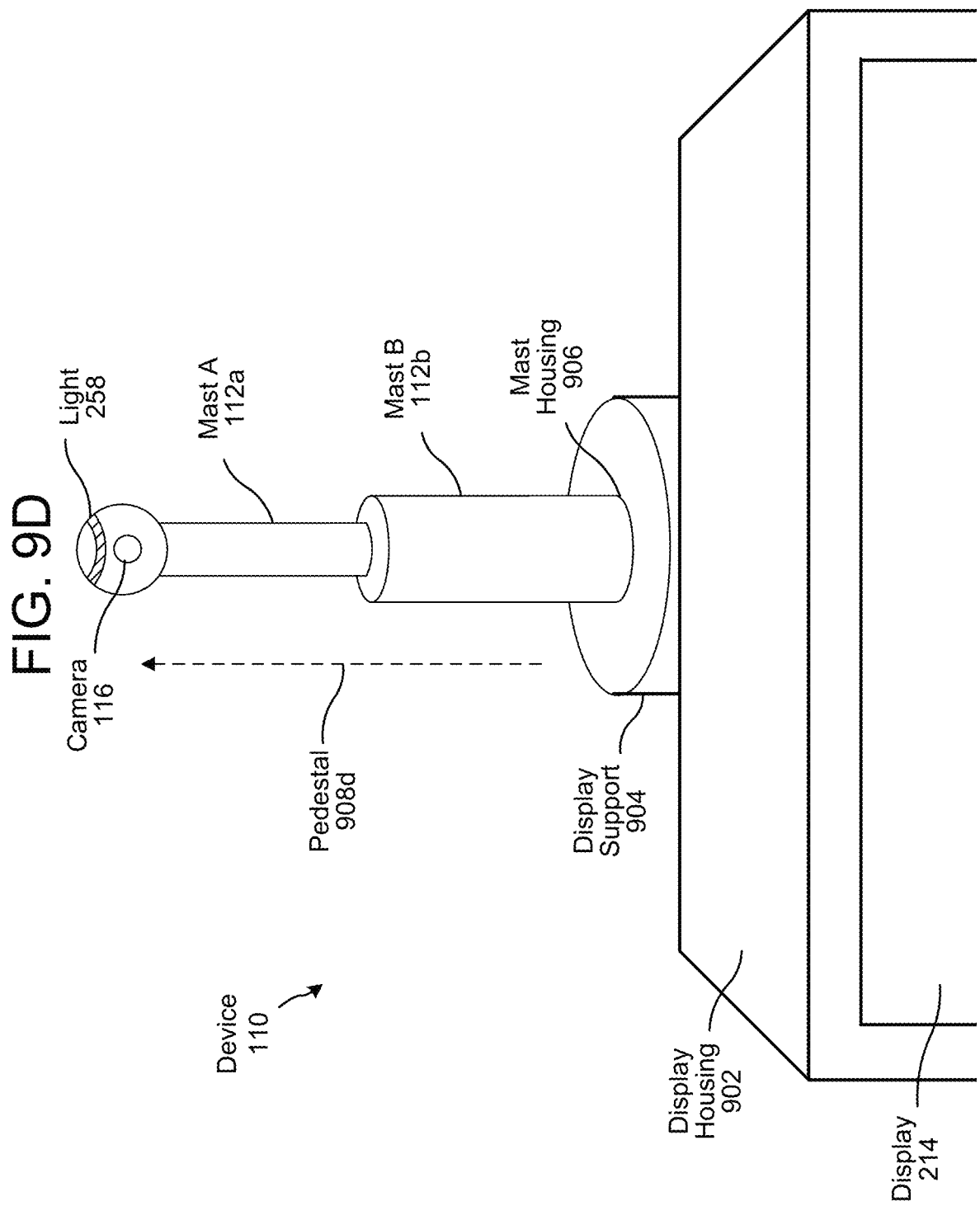

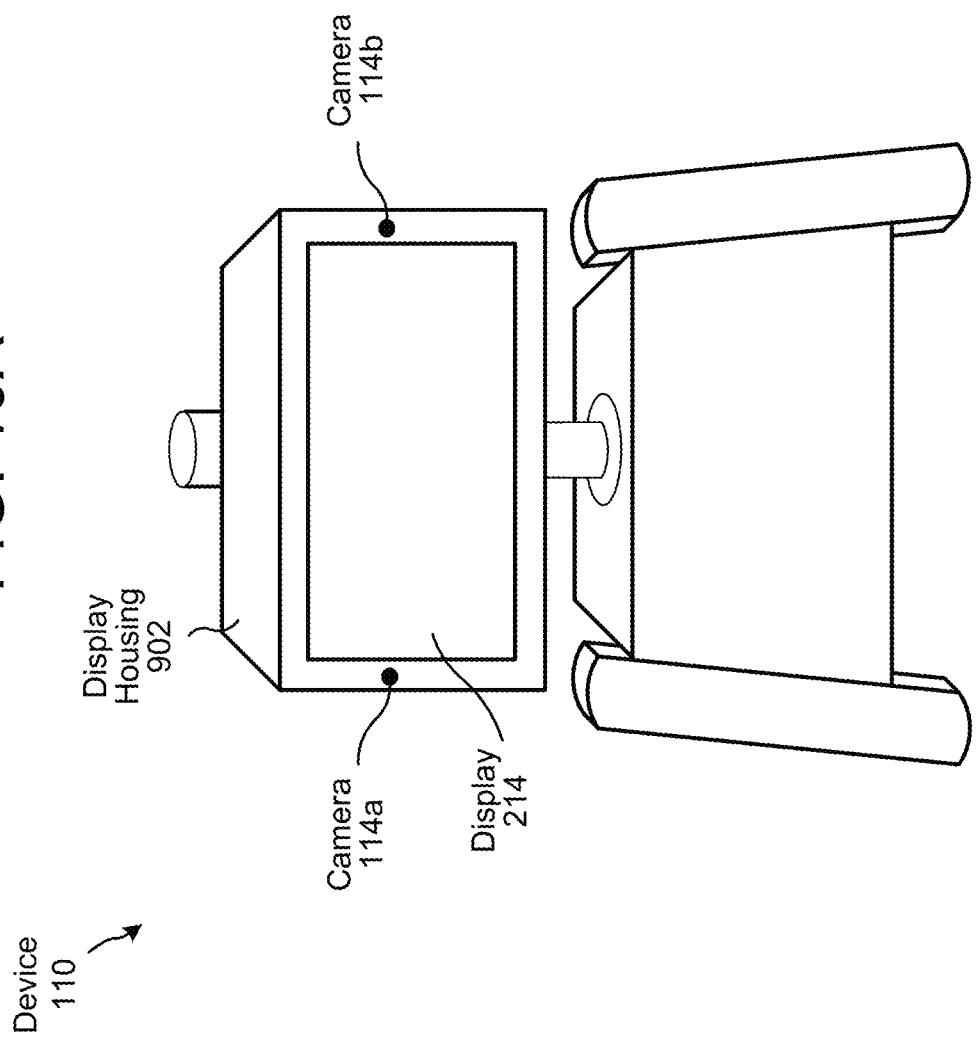

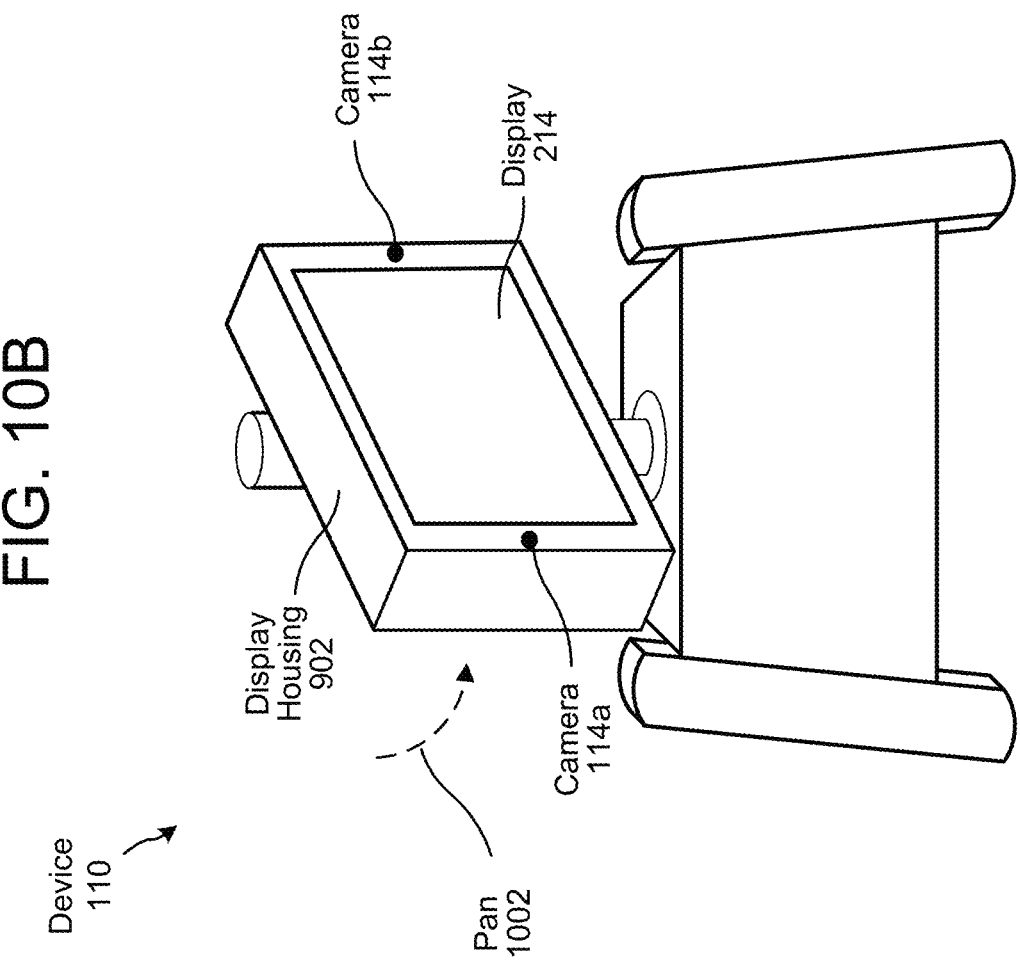

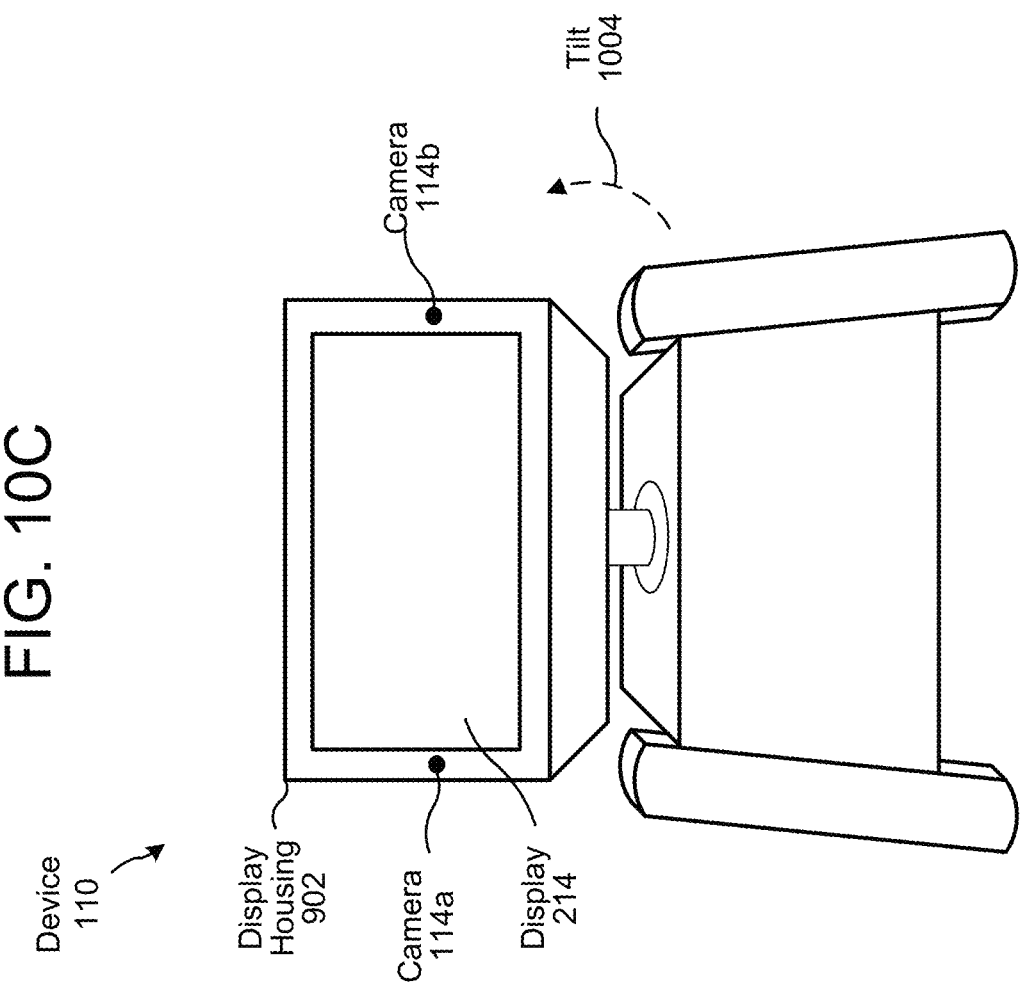

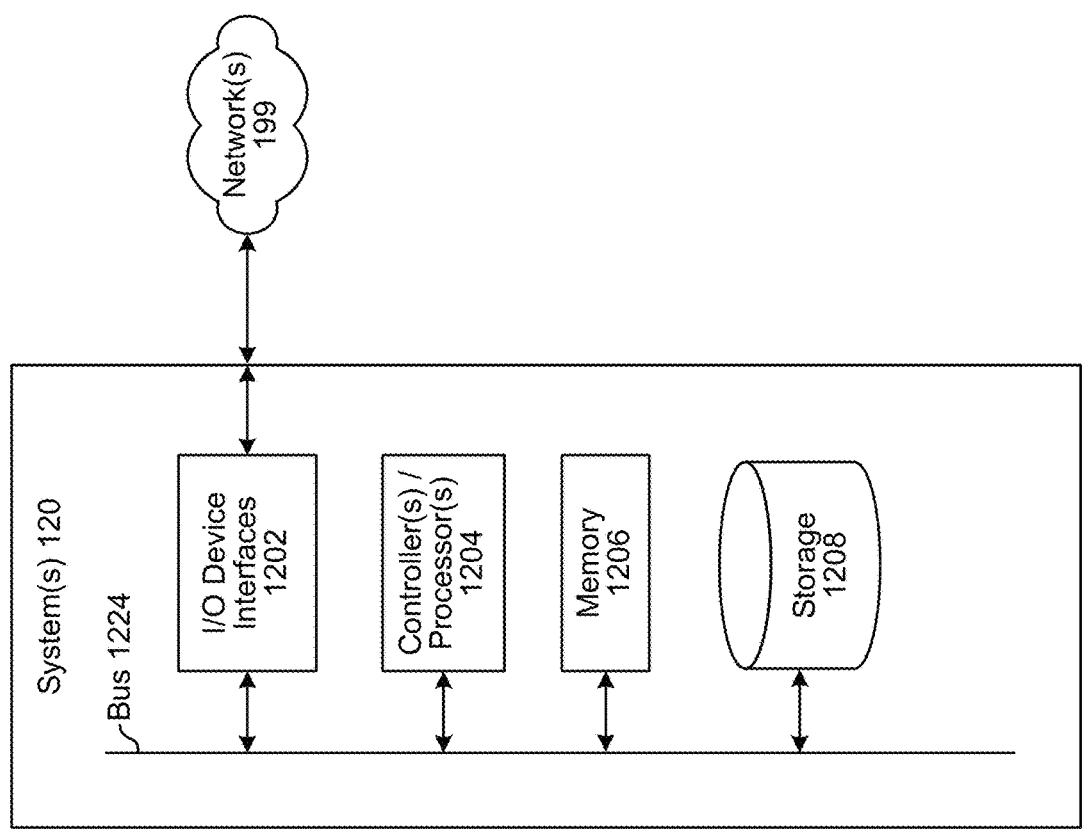

AUTONOMOUSLY MOTILE DEVICE WITH REMOTE CONTROL

BACKGROUND

An autonomously motile device may be capable of moving within an environment. The autonomously motile device may further include one or more cameras that capture still and/or moving images. These images may be sent over a network to one or more user devices to allow the users of the devices to remotely control the autonomously motile device.

BRIEF DESCRIPTION OF DRAWINGS

For a more complete understanding of the present disclosure, reference is now made to the following description taken in conjunction with the accompanying drawings.

FIGS. 1A and 1B illustrate systems and methods for controlling an autonomously motile device according to embodiments of the present disclosure.

FIGS. 2A, 2B, and 2C illustrate views of an autonomously motile device according to embodiments of the present disclosure.

FIGS. 2E-2F illustrate images captured by an autonomously motile device in an environment according to embodiments of the present disclosure.

FIGS. 3A, 3B, and 3C illustrate a display of a user device for controlling an autonomously motile device according to embodiments of the present disclosure.

FIGS. 5A-5E illustrate requested destinations of an autonomously motile device according to embodiments of the present disclosure.

FIG. 6 illustrates position and orientation information for an autonomously motile device according to embodiments of the present disclosure.

FIGS. 7A and 7B illustrate a method for controlling an autonomously motile device according to embodiments of the present disclosure.

FIGS. 8A and 8B illustrate an environment of and map for an autonomously motile device according to embodiments of the present disclosure.

FIGS. 9A-9D illustrate a first moveable element of an autonomously motile device according to embodiments of the present disclosure.

FIGS. 10A-10C illustrate a second moveable element of an autonomously motile device according to embodiments of the present disclosure.

FIG. 12 illustrates a block diagram of a server according to embodiments of the present disclosure.

DETAILED DESCRIPTION

Figure 1B:
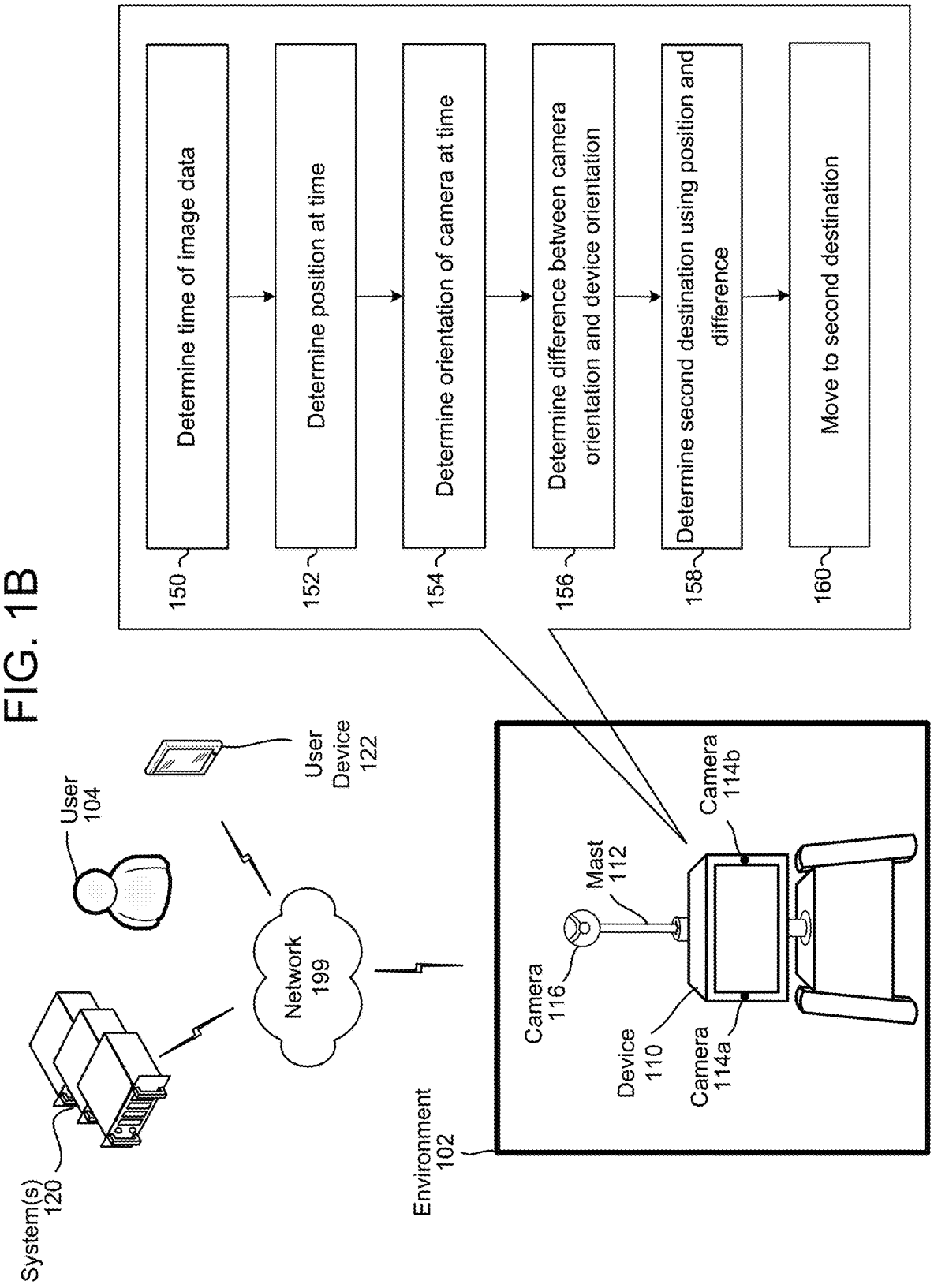

An autonomously motile device—e.g., a robot—may include, among other components, at least one camera capable of capturing image data of the device's surrounding environment (e.g., the physical space the device inhabits); this image data may include still, panoramic, and/or moving images (e.g., video). The camera may be used for a variety of functions, such as video communication. The camera may be mounted on a moveable component, such as a mast or display, that moves (e.g., pans, tilts, dollies, trucks, and/or pedestals) the camera with respect to the device and/or environment of the device. The device may transmit captured image data over a network to a user device, such as a cellular telephone or tablet computer, thus allowing a user of the user device to remotely view the images. The autonomously motile device may instead or in addition display the image data on a display of the device itself.

The device displaying the image data (e.g., the user device and/or autonomously motile device) may receive a user input, such as a touch gesture, mouse click, or key press, representing a request for the autonomously motile device to move to a location corresponding to the (x,y) coordinates of the user input. For example, if the image data includes an image of a floor of a room, a user may indicate a request to move the autonomously motile device to a location on the floor by touching the representation of that location.

If the autonomously motile device is stationary (e.g., not moving) and if the camera that captured the image data is oriented such that it is facing directly outwards from a front of the autonomously motile device, the requested destination may be determined by comparing the (x,y) screen coordinates to a size of the screen and/or window displaying the image data. As described herein, the distance of the movement to the requested destination may be determined from the y-coordinate, and the direction of the movement may be determined from the x-coordinate. The autonomously motile device may instead or in addition determine a three-dimensional ray from the device 110 based on the (x,y) coordinate and determine the destination by extending the ray in a two- or three-dimensional map of the environment 102 until it intersects with an obstruction. The device 110 may extend the ray through an obstruction to determine the destination if, by so extending the ray, the ray intersects with a representation of a floor of the environment. The device 110 may instead, if the ray intersects with an obstruction, determine that the destination lies at or near the point of intersection. If the map is a two-dimensional map, the destination may be determined to lie at or near the point of intersection with the first obstruction it reaches, regardless of the height of this first obstruction. If the map is a three-dimensional map, the destination may be determined to lie beyond a first obstruction having a small height (e.g., the ray does not intersect the first obstruction in three-dimensional space) and may instead lie at a point of intersection with a second obstruction or a representation of a floor. The device 110 may similarly determine that the destination lies at a point of intersection with a dynamic obstruction (e.g., a person capable of movement in the environment 102) or may lie beyond the point of intersection with the dynamic obstruction.

If, however, the camera is oriented such that it faces a direction other than outwards from the front of the autonomously motile device, the autonomously motile device may translate the orientation of the camera to the orientation of the autonomously motile device. For example, if the outwards-facing direction of the autonomously motile device is designated as 0° (e.g., "north"), and if the camera is facing at 90° (e.g., "east"), and if the user input corresponds to an input in the center of the screen or window, the autonomously motile device may first turn 90° to its right (to account for the camera orientation) before moving forward. In other words, the orientation of the camera may be translated to the orientation of the device by determining a difference (in, e.g., degrees) between the two orientations and then rotating the determined destination with respect to the device by the degree of difference.

If the autonomously motile device is changing its position (e.g., moving) and/or if the camera is changing its orientation (e.g., moving) when the user input is detected, the autonomously motile device may determine the time of the user input and determine the position of the autonomously motile device and/or orientation of the camera at the time of the user input. Receiving the user input and determining the distance and direction may require processing that spans a period of time, due to, for example, network latency, and the image data received from the camera may change during this period of time. Using last-received image data from the camera may thus lead to a difference between the intended destination of the user and the determined destination. The autonomously motile device may thus store historical position and/or orientation information for the period of time and determine the position and/or orientation of the device and/or camera at the time of the user input. The orientation of the camera may be used to rotate the determined position, as described above, and the position of the device (which may include the (x,y) coordinate of the device and/or the orientation of the device) may similarly be used to rotate and/or translate the determined position.

FIGS. 1A and 1B illustrates an autonomously motile device 110 configured to capture image data and may include one or more cameras, such as a camera 116 which may be mounted on a mast 112 and/or a camera 114 mounted on a display, which may capture image data representing a viewable portion of an environment 102 in accordance with the present disclosure. Although the figures and discussion of the present disclosure illustrate certain operational steps of a method in a particular order, the steps described may be performed in a different order (as well as certain steps removed or added) without departing from the intent of the disclosure. In various embodiments, the autonomously motile device 110 communicates with a system 120 and/or user device 122 using a network 199.

The autonomously motile device 110 may be capable of autonomous motion using one or motors powering one or more wheels, treads, robotic limbs, wings, propellers, or similar actuators, but the present disclosure is not limited to particular method of autonomous movement/motion. The device 110 may further include one or more display screens for displaying information to a user and/or receiving touch (or other) input from a user. The device 110 may further include a microphone array 210 including one or more microphones and one or more loudspeakers; the microphone array 210 may be used to receive audio data, such as an utterance represented by user audio, from the user. The utterance may be, for example, a command or request. The loudspeaker of device 110 may be used to output audio to the user, such as audio related to a response to command or audio related to response to a request.

The device 110 may further include one or more sensors (as shown in greater detail with reference to FIG. 11D); these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation and/or rotation of a component, such as a camera, but not linear motion; the device 110 may be mounted or placed on a surface or floor, for example, and may rotate in place and/or rotate the component to face a user. The disclosure is not, however, limited to only these devices or components, and the device 110 may include additional components without departing from the disclosure.

In various embodiments, with reference to FIG. 1A, the autonomously motile device 110 determines (130) data comprising an indication of a destination in an environment (e.g., an (x,y) coordinate on a screen of a user device 122 of a user 104 or a screen of the autonomously motile device). The device 110 determines (132) a size of a horizontal field of view of the camera. The device 110 determines (134) a travel direction based on the size and the value of the x-coordinate. The device 110 determines (136) a maximum travel distance (e.g., 5 meters) and determines (138) a distance of movement of the autonomously motile device in the environment (by, e.g., determining a product of the maximum distance and a ratio between the y-coordinate and a screen height). The device 110 determines (140), based on the direction and distance, a destination in the environment. The device may then move to the destination.

In some embodiments, with reference to FIG. 1B, the autonomously motile device 110 determines (150) a time of the image displayed on the user device at a time of user input. The time may be an absolute time (e.g., "wall clock" time), an indication of a frame of video, or any other such representation of time. The device 110 determines (152) a position of the device 110 at the time and determines (154) an orientation of the camera at the time. The device 110 determines (156) a difference between the camera orientation and the device orientation. The device 110 determines (158) a second destination using the position and the difference. The device 110 may then move (160) to the second destination.

Figure 2A:
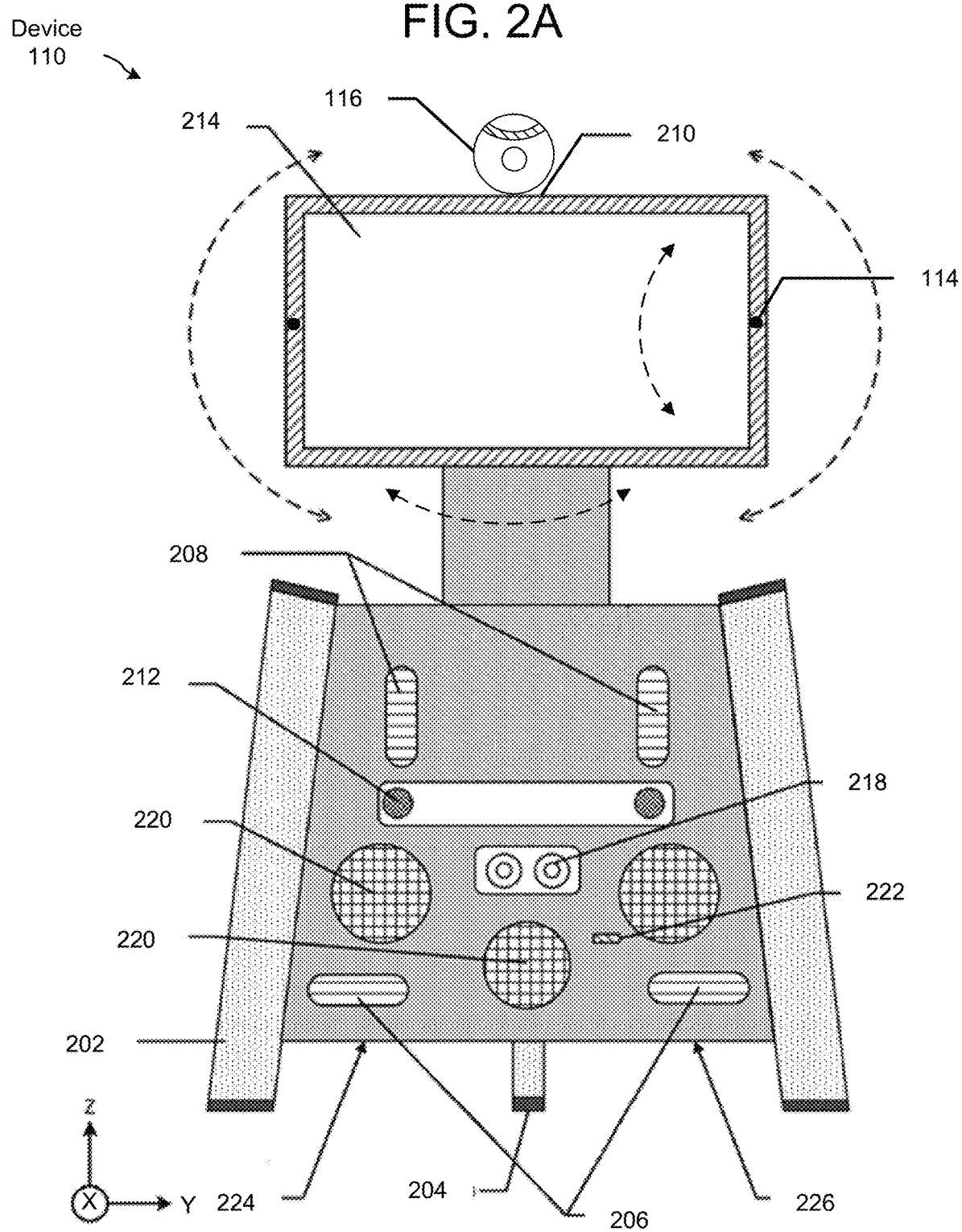
Figure 2B:
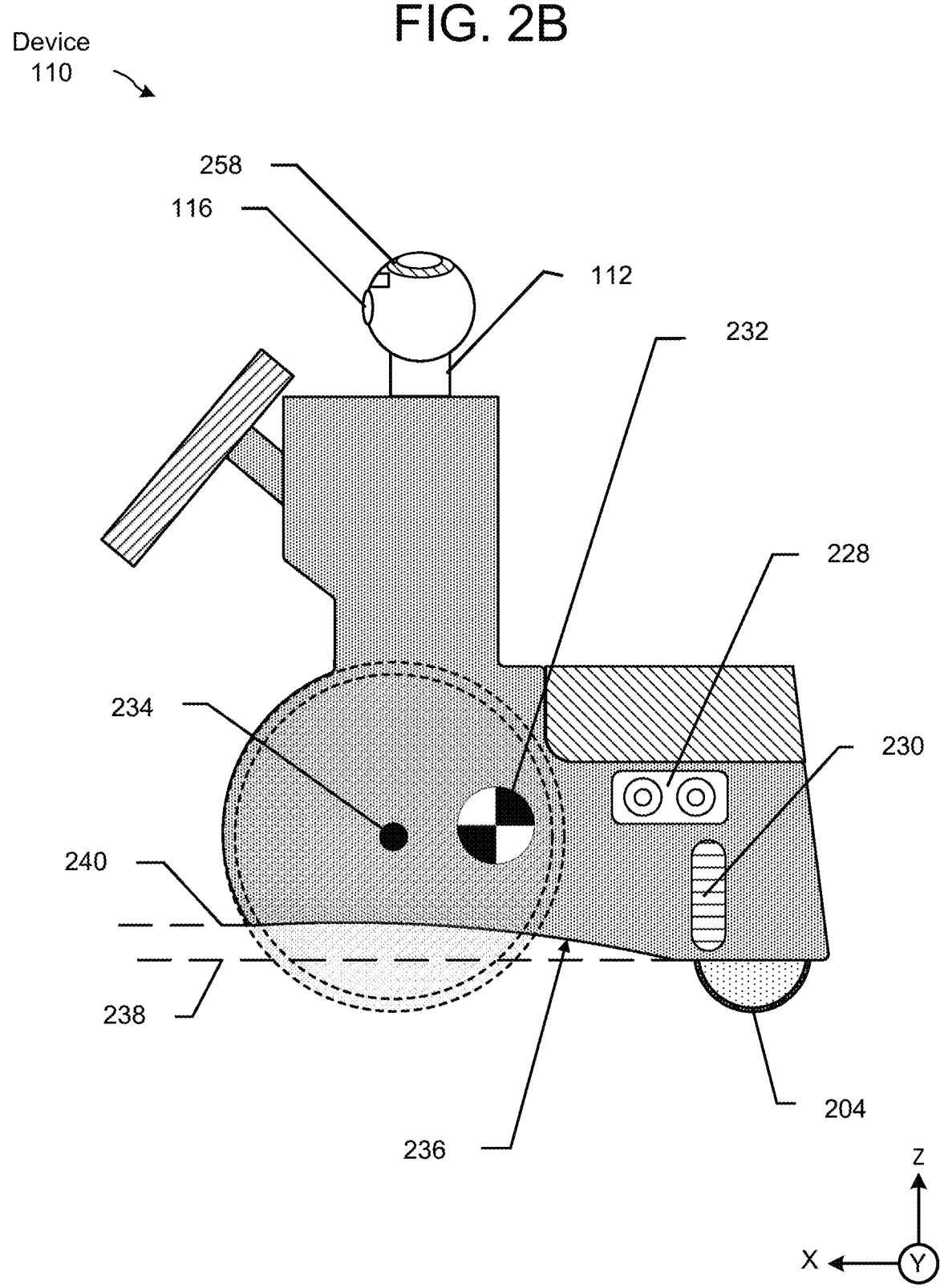

FIGS. 2A-2C illustrate an autonomously motile device 110 according to various embodiments of the present disclosure. Referring first to FIG. 2A, the device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

The device 110 may have one or more cameras mounted on one or more surfaces of the device 110. The cameras may be capable of capturing image data; this image data may be still pictures or moving video. The cameras may further be capable of capturing wavelengths of light outside of the visible spectrum, such as infrared light. The device 110 may include a camera 212 mounted to a fixed surface of the device 110. The device 110 may further include a camera 114 mounted on a display 214; the display 214, and thus the camera 114 mounted thereon, may be capable of horizontal rotation (e.g., camera "pan" motion) and/or vertical rotation (e.g., camera "tilt" motion). The device 110 may also feature a camera 116 mounted on a mast 112; this camera 116 may also be capable of pan and tilt and may further change its vertical position with respect to the device 110 upon extension/retraction of the mast 112 (e.g., camera "pedestal" motion).

The one or more cameras 212 may be mounted to the front of the device 110; two cameras 212 may be used to provide for stereo vision. The distance between two cameras 212 may be, for example, 5-15 centimeters; in some embodiments, the distance between the cameras 212 is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

Cameras 212 used for navigation may be of different resolution from, or sensitive to different wavelengths than, other cameras 114, 116 used for other purposes, such as video communication. For example, navigation cameras 212 may be sensitive to infrared light allowing the device 110 to operate in darkness or semi-darkness, while a camera 114 mounted on the display 214 and/or a camera 116 mounted on a mast 112 may be sensitive to visible light and may be used to generate images suitable for viewing by a person. A navigation camera 212 may have a resolution of approximately 300 kilopixels, while the other cameras 114, 116 may have a resolution of approximately 10 megapixels. In some implementations, navigation may utilize a single camera 212.

The cameras 212 may operate to provide stereo images of the environment, the user, or other objects. For example, an image from the cameras 212 may be accessed and used to generate stereo-image data corresponding to a face of a user. This stereo-image data may then be used for facial recognition, user identification, gesture recognition, gaze tracking, and other uses.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another. An ultrasonic sensor 218 may be mounted on the front of the device 110 and may be used to provide sensor data that represents objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the front and/or underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated; the right side may include similar features. The mast 112 is extended to a first position; a camera 116 is disposed at an upper end of the mast 112. An ultrasonic sensor 228 and an optical sensor 230 may be disposed on either side of the device 110. The camera 116 may be capable of rotation, panning, and tilting, and may capture a panoramic image.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster is shown in a trailing configuration, in which the caster is located behind or aft of the wheel axle 234 and the center of gravity 232. In another implementation (not shown) the caster may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within a lower structure of the device 110. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 112, which may include a camera 116 and a light 258.

Figure 2D:
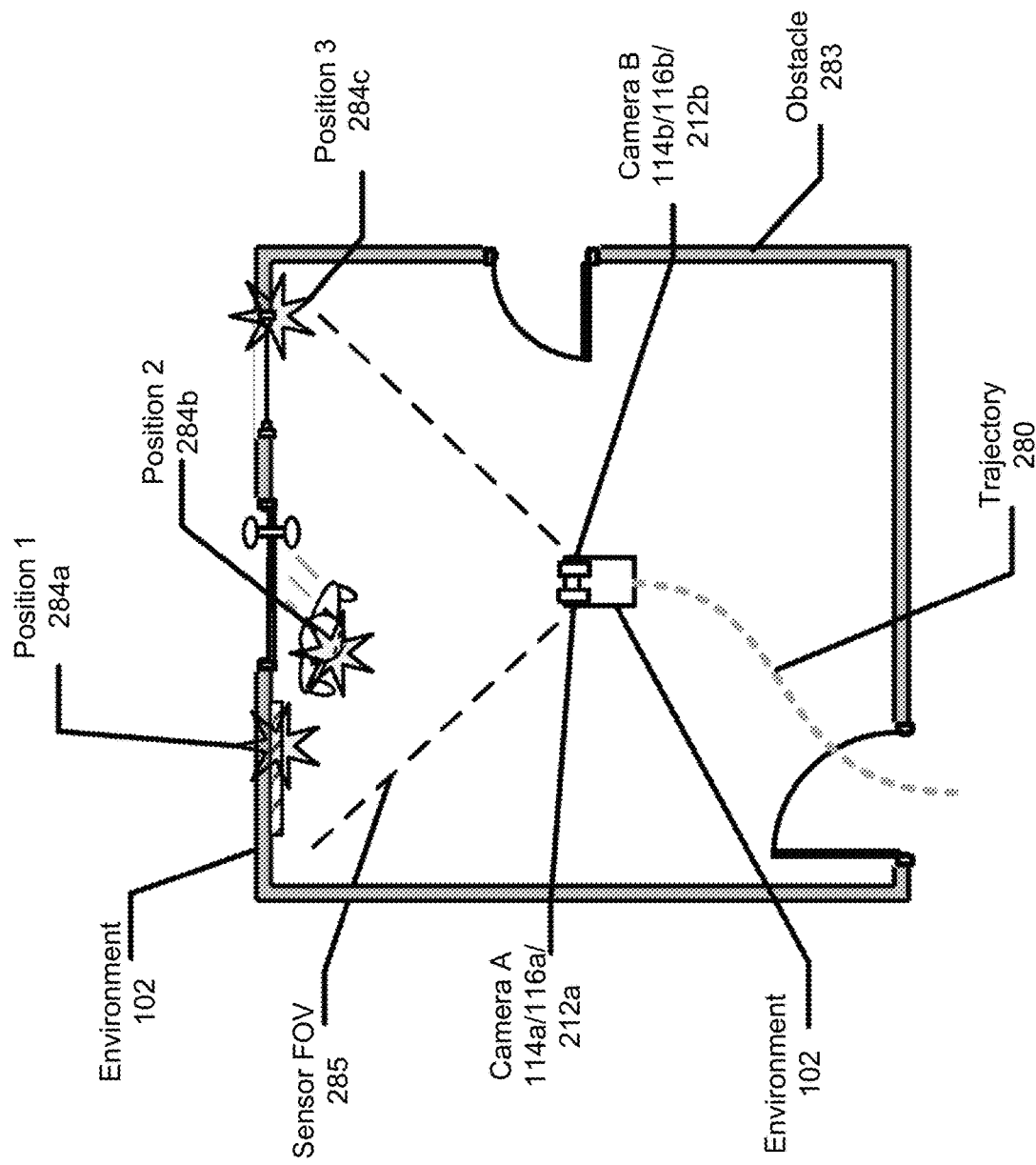
FIG. 2D illustrates a view of an autonomously motile device in an environment according to embodiments of the present disclosure.

As shown in FIG. 2D, the autonomously motile device 110 may move in the environment 102. The motion of the autonomously motile device 110 may be described as a trajectory 280, as shown in FIG. 2D. In some implementations, the trajectory 280 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 102 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 11A:
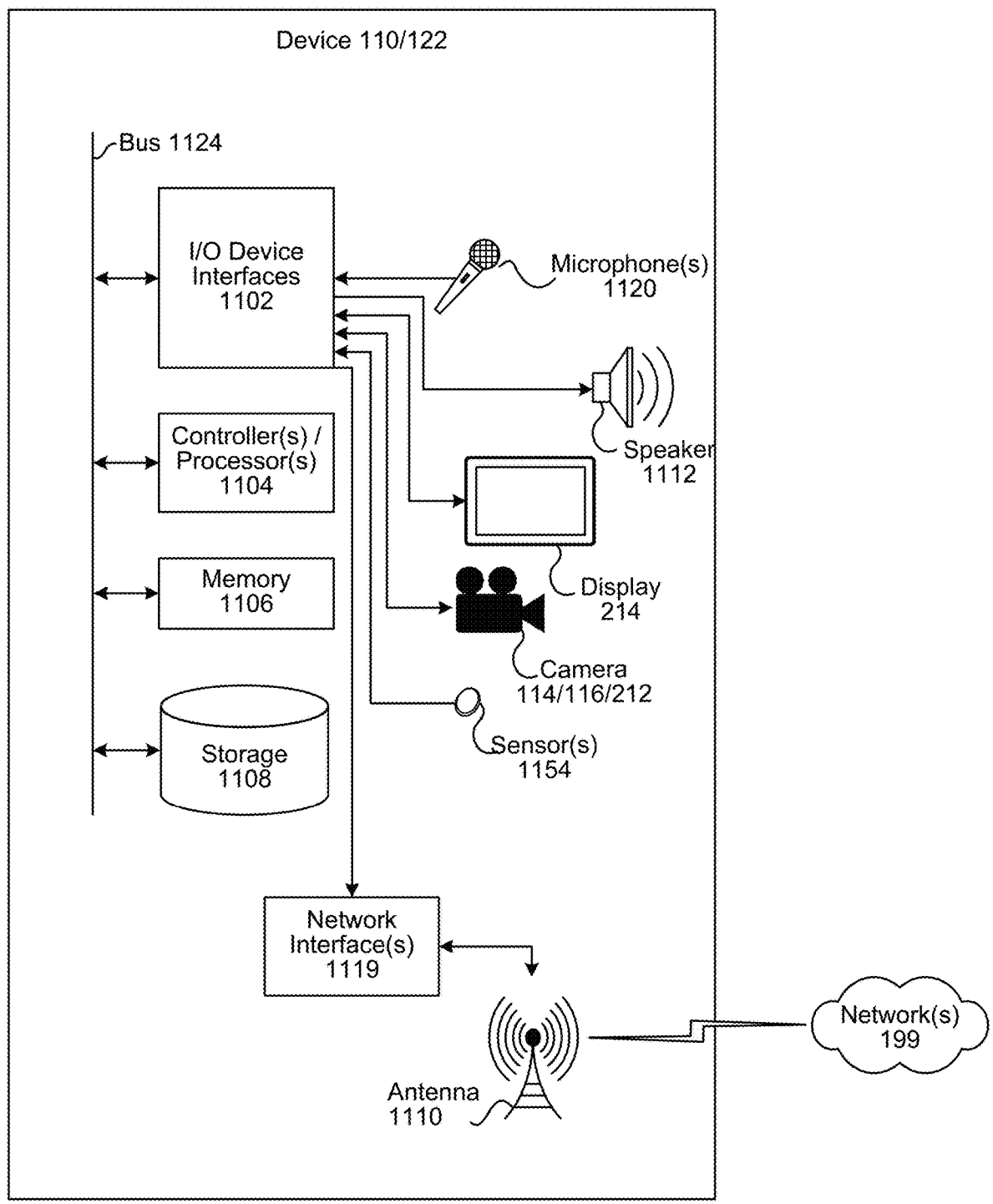
FIG. 11A illustrates a block diagram of an autonomously motile device or user device according to embodiments of the present disclosure.

The autonomously motile device 110 may include one or more sensors 1154 (shown below in FIG. 11D). For example, the sensors 1154 may include a first camera 114*a*/116*a*/212*a*, a second camera 114*b*/116*b*/212*b*, an inertial measurement unit (IMU) 1180, microphones, time-of-flight (TOF) sensors, and so forth. The first camera 114*a*/116*a*/212*a* and the second camera 114*b*/116*b*/212*b* may be mounted to a common rigid structure that maintains a relative distance between the cameras 114/116/212. An IMU 1180 may be attached to this common rigid structure, or one of the cameras affixed thereto. The first camera 114*a*/116*a*/212*a* and the second camera 114*b*/116*b*/212*b* may be arranged such that a sensor field-of-view (FOV) 285 of the first camera 114*a*/116*a*/212*a* overlaps at least in part a sensor FOV of the second camera 114*b*/116*b*/212*b*. The sensors 1154 may generate sensor data 1147 (which may be stored in storage 1108 as illustrated in FIG. 11C discussed below). The sensor data 1147 may include image data 1142 acquired by the first camera 114*a*/116*a*/212*a* and the second camera 114*b*/116*b*/212*b*. For example, as shown in FIG. 2E, a pair of images 282 may comprise image data 1142 from the first camera 114*a*/116*a*/212*a* and the second camera 114*b*/116*b*/212*b* that are acquired at the same time. For example, a first pair of images 282*a* are acquired at time $t_1$ and a second pair of images 282*b* are acquired at time $t_2$. The sensors 1154 are discussed in more detail with regard to FIG. 11D.

During operation the autonomously motile device 110 may determine input data. The input data may include or be based at least in part on sensor data 1147 from the sensors 1154 onboard the autonomously motile device 110. In one implementation, a speech processing component 1137 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

Figure 11B:
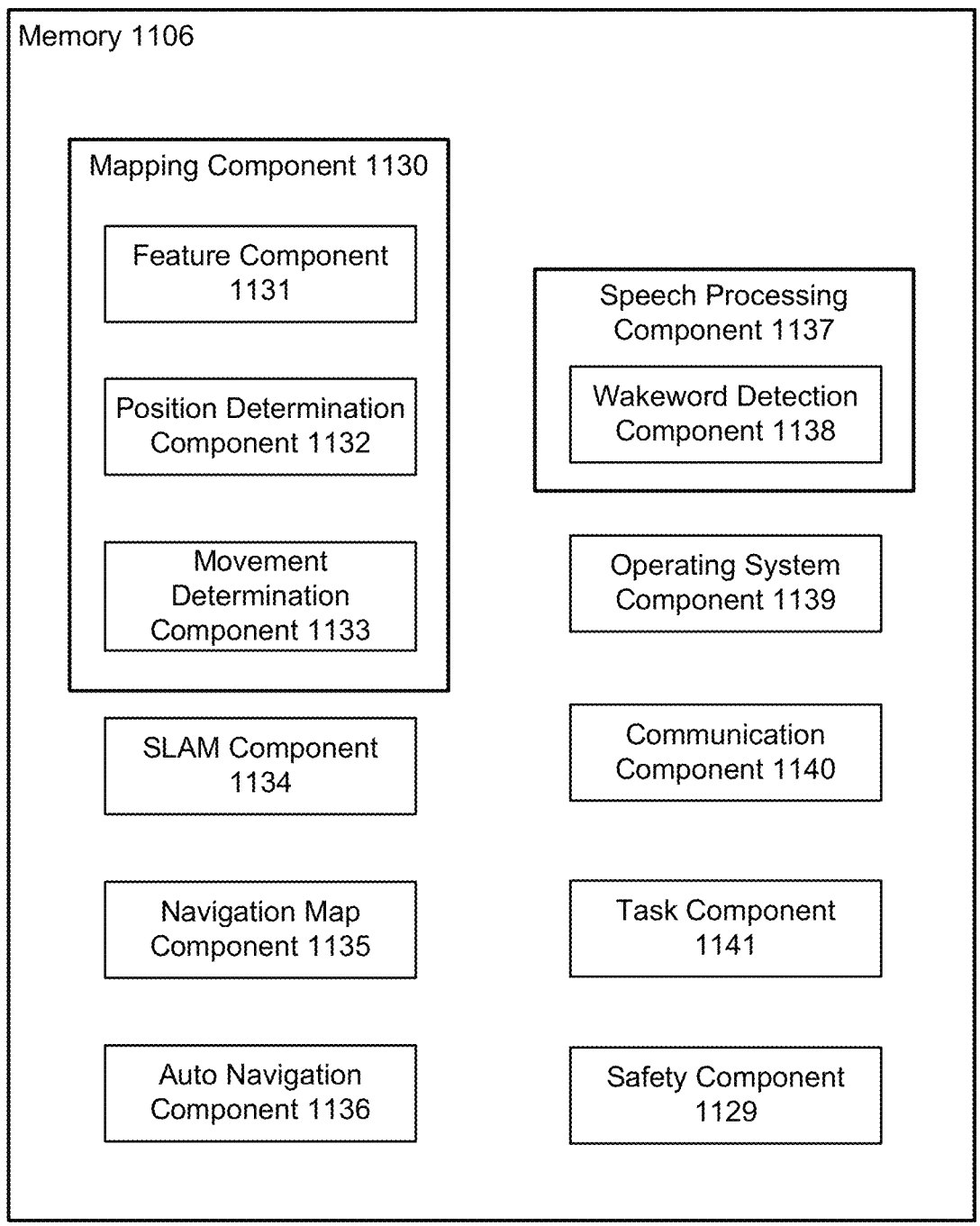
FIG. 11B illustrates components that may be stored in a memory of an autonomously motile device according to embodiments of the present disclosure.
Figure 11C:
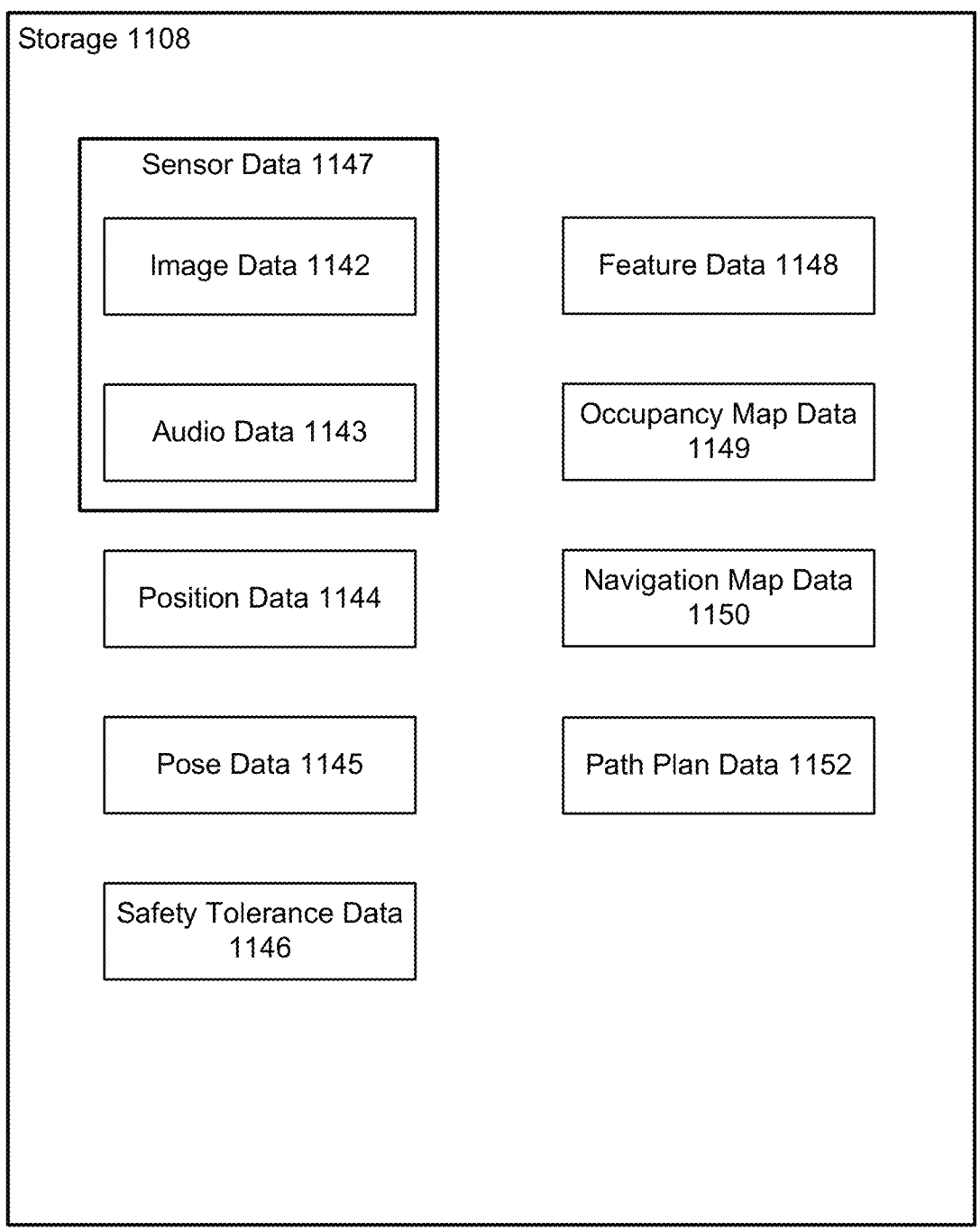
FIG. 11C illustrates data that may be stored in a storage of an autonomously motile device according to embodiments of the present disclosure.

A mapping component 1130 (which may be included in memory 1106 as illustrated in FIG. 11B further discussed below) determines a representation of the environment 102 that includes the obstacles 283 and their location in the environment 102. During operation the mapping component 1130 uses the sensor data 1147 from various sensors 1154 to determine information such as where the autonomously motile device 110 is, how far the autonomously motile device 110 has moved, the presence of obstacles 283, where those obstacles 283 are, and so forth.

A feature module processes at least a portion of the image data 1142 to determine first feature data 1148. The first feature data 1148 is indicative of one or more features 286 that are depicted in the image data 1142. For example, as shown in FIG. 2F, the features 286 may be edges of doors, shadows on the wall, texture on the walls, portions of artwork in the environment 102, and so forth. The environment 102 may include display devices that are capable of changing the images they portray. For example, a television 288 may be presented in the environment 102. The picture presented by the television 288 may also have features 286.

Various techniques may be used to determine the presence of features 286 in image data 1142. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 286 in the image data 1142. A feature 286 that has been detected may have an associated descriptor that characterizes that feature 286. The descriptor may comprise a vector value in some implementations. For example, the descriptor may comprise data indicative of the feature with respect to 256 different dimensions.

The first feature data 1148 may comprise information such as the descriptor for the feature 286, the images that the feature 286 was detected in, location in the image data 1142 of the feature 286, and so forth. For example, the first feature data 1148 may indicate that in a first image the feature 286 is centered at row 994, column 312 in the first image. These data and operations, along with those discussed below, may be used by the autonomously motile device 110, and/or other devices, to perform the operations described herein.

Figure 3A:
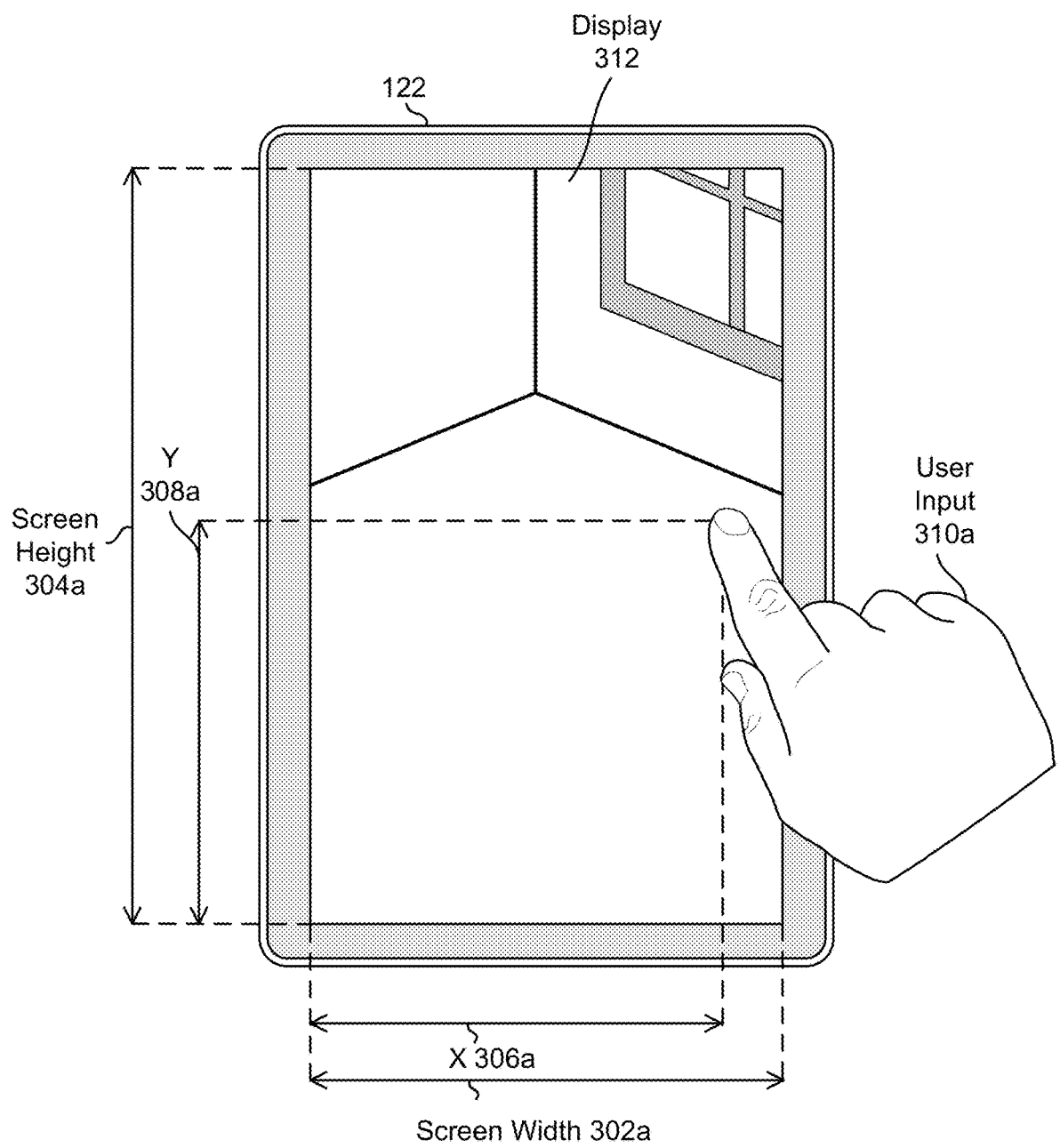
Figure 3C:
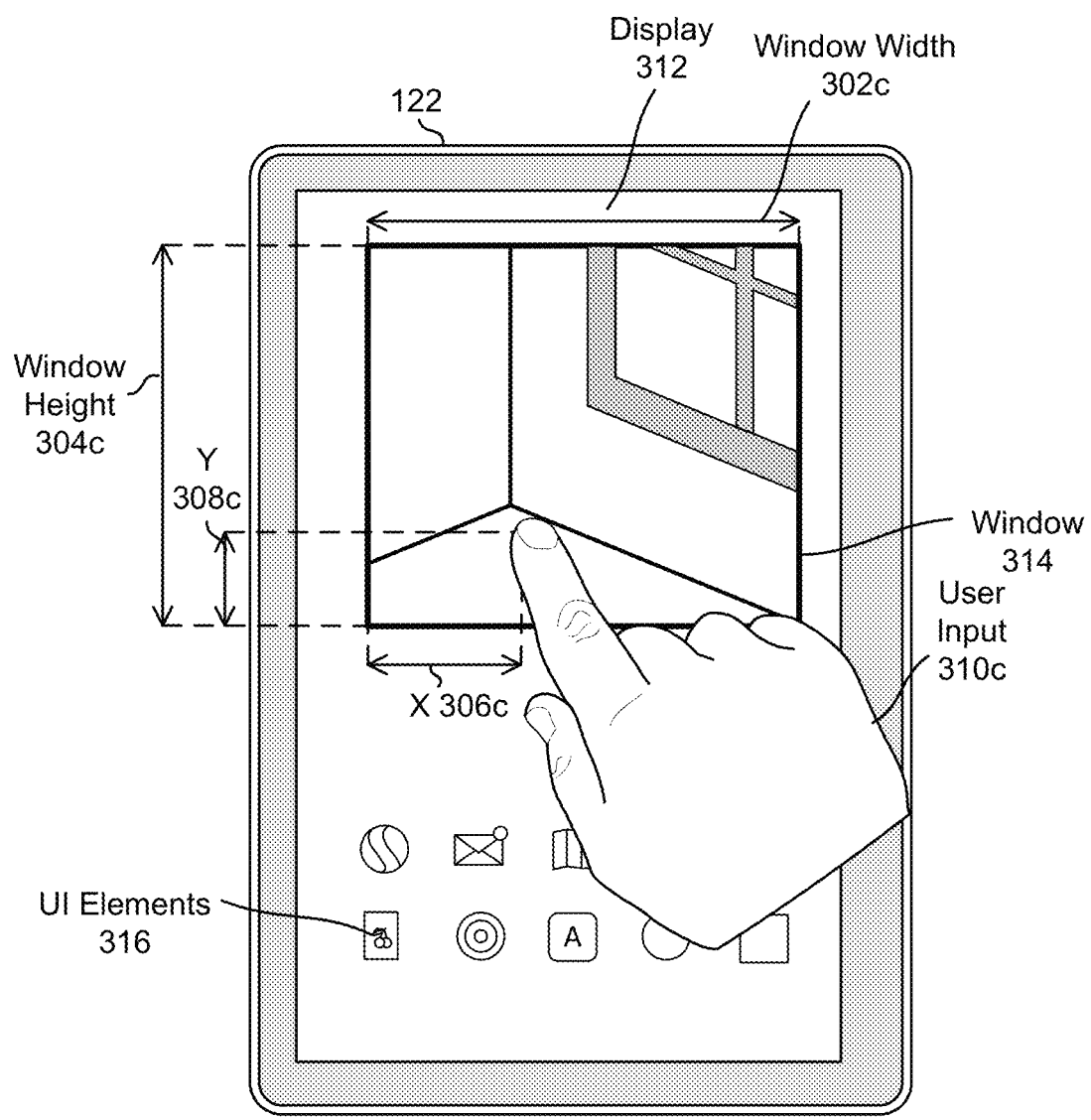

FIGS. 3A-3C illustrate an example user device 122. Referring first to FIG. 3A, the user device 122 includes a display 312 for displaying image data captured by a camera 114/116/212 of the autonomously motile device 110 corresponding to the environment 102 of the device 110. As described herein, however, the autonomously motile device 110 may display the image data on its own screen (e.g., display 214). The display 312 may have a screen width 302a and a screen height 304a; the width 302a and height 304a may be, for example, 1024×768 pixels, 1920×1080 pixels, or any other such size. The present disclosure is not limited to any particular size or shape of the display 214.

The user device 122 and/or autonomously motile device 110 may detect a user input 310a, which may be a touch gesture, mouse click, key press, or other such input. The user input may instead or in addition be a voice command, such as "move forward one meter." The present disclosure is not limited to any particular type of user input.

The user device 122 and/or autonomously motile device 110 may determine that the user input 310a corresponds to an x-coordinate 306a and a y-coordinate 308a. For example, the display 312 may include capacitive and/or resistive sensors that sense the capacitance and/or pressure of the user input 310a at the corresponding (x,y) coordinate. The display 312 may, for example, include a grid of horizontal and vertical sensor elements; the (x,y) coordinate may be determined by a change in capacitance and/or resistance in a subset of the horizontal and vertical sensor elements. Any system or method for detecting touch inputs (or other types of inputs) is within the scope of the present disclosure.

The display 312 may further include icons or other user interface elements that represent various locations in the environment and/or dispositions of the device 110. The device 122 may detect input (e.g., a touch gesture) corresponding to an icon and travel to a destination and/or adopt an orientation corresponding to the location. The icons may be determined by, for example, receiving an indication of request to save a particular current location and/or disposition. For example, an icon may display an image of a fish; when input corresponding to the icon is received, the device 110 may travel to a location in the environment that permits view of a fish tank and configure one or more cameras of the device 110 to capture image data that includes images of the fish tank.

As shown in FIG. 3B, the user device 122 and its display 312 may be oriented in a landscape orientation (as opposed to the portrait orientation illustrated in FIG. 3A). In this orientation, the user device 122 has a screen width 302b and a screen height 304b. A user input 310b may similarly be detected; the user input 310b may similarly correspond to an x-coordinate 306b and a y-coordinate 308b. The present disclosure is not limited to any particular orientation of the user device 122.

As shown in FIG. 3C, the user device 122 may display the representation of the environment 102 in a window 314 of the display 312. The window 314 may be of any size less than that of the display 312. The user device 122 may display other user-interface elements 316 in areas of the display 312 outside of the window 314.

A user input 310c may be detected and, similar to the above, a corresponding x-coordinate 306c and y-coordinate 308c may be determined. As described herein, a screen width 302 and screen height 304 may be used to determine a direction and distance corresponding to the user input 310c; if the user device 122 displays the representation of the environment 102 in a window 314, however, a window width 302c and window height 304c may be substituted for the screen width and screen height, respectively.

Figure 4A:
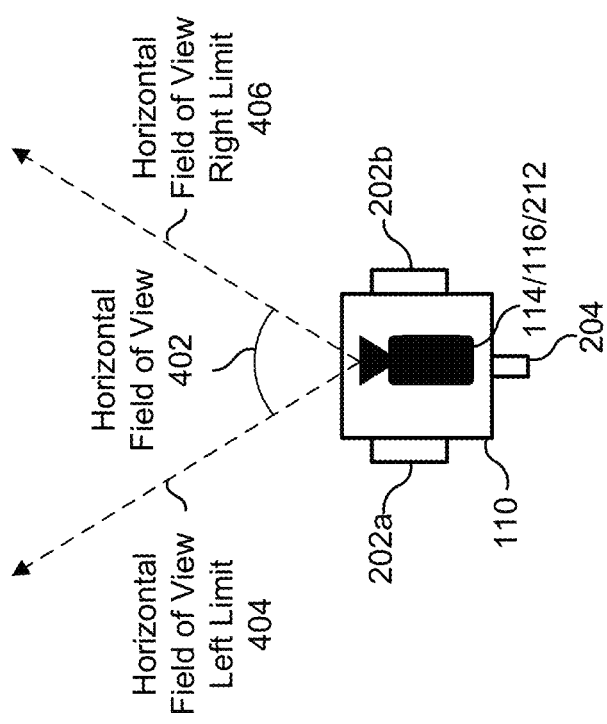
FIGS. 4A and 4B illustrate fields of view of an autonomously motile device capable according to embodiments of the present disclosure.
Figure 4B:
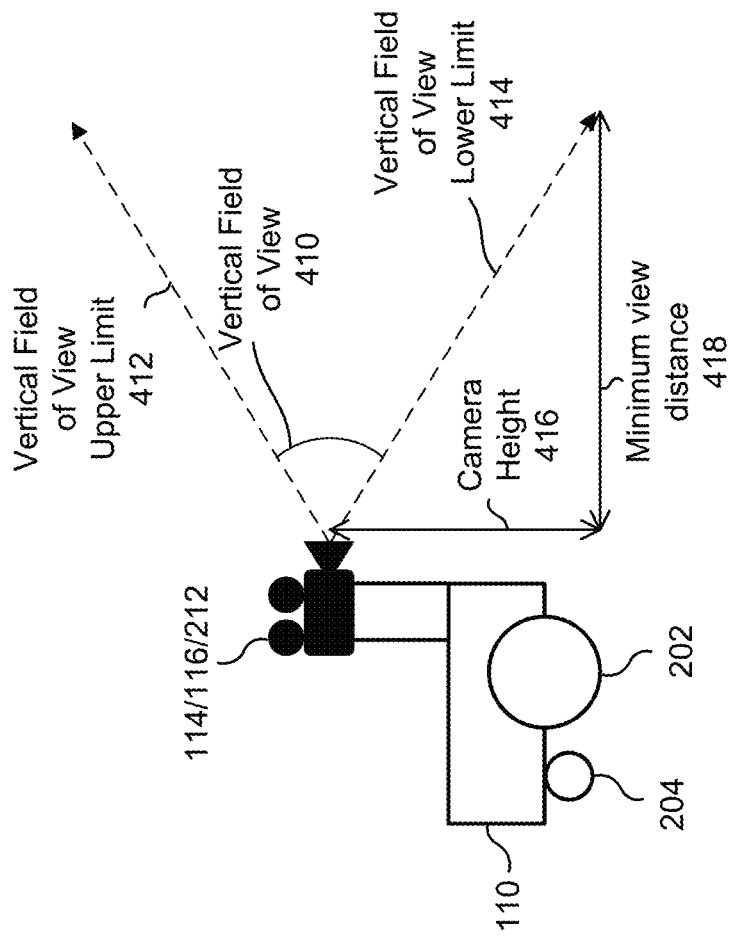

FIGS. 4A and 4B illustrate properties of the camera(s) 114/116/212 in accordance with embodiments of the present disclosure. Referring first to FIG. 4A, a top view of the autonomously motile device 110 is illustrated; the wheels 202a, 202b and caster 204 may be visible in this top view. A camera 114/116/212 may have a horizontal field of view 402 corresponding to a left-to-right limit of how much of the environment 102 it may capture as image data. This horizontal field of view 402 may be defined by a left limit 404 and a right limit 406. The horizontal field of view may be expressed as a number of degrees, such as 70°. Different cameras 114/116/212 may have different horizontal fields of view; a fisheye camera, for example, may have a larger horizontal field of view than a conventional camera. The camera(s) 114/116/212 may have any size horizontal field of view 402.

Referring to FIG. 4B, a side view of the autonomously motile device 110 is illustrated. The camera(s) 114/116/212 may similarly exhibit a vertical field of view 410 having an upper limit 412 and a lower limit 414. Like the horizontal field of view 402, the vertical field of view 410 may be any value; in some embodiments, that value is 40°. The camera(s) 114/116/212 may be disposed at a height 416 above a floor of the environment 102. This height 416 may change when a component of the device 110, such as the mast 112 or display 214, moves. The height 416 and lower limit 414 of the vertical field of view may define a minimum view distance 418 of the device 110. Representations of portions of the environment disposed within the boundary defined by the lower limit 414, camera height 416, and minimum view distance 418 may not appear in image data captured by the camera(s) 114/116/212. In other words, the floor of the environment 102 and/or objects on the floor of the environment 102 too close to the device 110 may not be seen by the camera(s) 114/116/212.

After the user input 310 is detected and corresponding x- and y-coordinates determined, the distance and direction of motion may be determined in accordance with embodiments described herein. In some embodiments, as described above, the (x,y) coordinate of the touch input is used to determine a direction of a ray extending from a representation of the device 110 in a three-dimensional map of the environment 102. The destination of the device 102 may then be determined by a point of intersection of the ray and an obstruction, such as a representation of a wall or item of furniture, in the map; the destination may similarly be determined by a point of intersection of the ray and a representation of a floor of the environment. The horizontal angle of the ray with respect to the device 110 may be determined by multiplying a normalized x-coordinate of the touch input (e.g., a position of the x-coordinate on the display 312 divided by the width of the display 312) by the size of the horizontal field of view. The vertical angle of the ray with respect to the device 110 may be determined by multiplying a normalized y-coordinate of the touch input (e.g., a position of the y-coordinate on the display 312 divided by the height of the display 312) by the size of the vertical field of view.

In other embodiments, the destination may be determined in accordance with the below two equations (1) and (2), respectively. Equations (1) and (2) describe that the travel distance corresponds to a fraction of a maximum travel distance, wherein the fraction is based on the ratio of the y-coordinate 308 to the height 304 of the display 312. The travel distance may further be based on the minimum view distance 418; because the camera 114/116/212 may not be able to view portions of the environment closer than the minimum view distance 418, any determined travel distance may necessarily be greater than the minimum view distance 418. The travel direction may similarly correspond to a fraction of the horizontal field of view 402, wherein the fraction is based on the ratio of the x-coordinate to the width 302 of the screen 312.

$$\text{distance} = \frac{Y\ coord \times (\text{max travel distance} - \text{min view distance})}{\text{screen height}} + \text{min view distance} \quad (1)$$

$$\text{direction} = \frac{\frac{1}{2}\text{screen width} - X\ coord}{\frac{1}{2}\text{screen width}} \times \frac{1}{2}\text{horizontal } FOV \quad (2)$$

Referring first to equation (1), the distance of movement may be determined by multiplying the y-coordinate 308 of the input by the difference between a maximum travel distance (e.g., 5 meters) and the minimum view distance 418 (e.g., 1 meter), dividing by the screen height 304, and then adding the result to the minimum view distance 418. The maximum travel distance may be based on a largest dimension of a typical room size of an environment 102. The maximum travel distance may be fixed, may be selected by a user, or may be determined by the device 110 by determining a maximum or average room size using a map of the environment 102. Dividing the y-coordinate 308 by the screen height 304 (in, e.g., pixels) cancels out the dimension of the pixels and thus makes equation (1) agnostic to the particular size of the screen 312, as described above. The minimum view distance 418 may be added to the result of this operation to account for the fact that any user input on the display 312 corresponds to a location in the environment 102 that is necessarily farther away from the device 110 than at least the minimum view distance 418 because the camera 114/116/212 cannot display that part of the environment 102. An input corresponding to a portion of the display 312 closer to its top thus results in a greater distance than an input corresponding to a portion of the display 312 closer to its bottom.

In some embodiments, the user device 122 sends the x-coordinate 306 and a y-coordinate 308 to the autonomously motile device 110; the autonomously motile device 110 may determine the height and width of the screen 312 and/or window 314 by, for example, identifying a type of the user device 122, sending the type to a remote system, such as the system 120, and receiving the height and width in response. The user device 122 may instead or in addition send the height and width to the autonomously motile device 110 when it sends the x-coordinate 306 and a y-coordinate 308 or as part of a separate transmission. The autonomously motile device 110 may identify the user device 122 using, for example, a network address and/or device identifier and store the identity of the device with the height and width for future reference. The autonomously motile device 110 may then determine the distance and direction using equations (1) and (2), as described above. In other embodiments, the user device 122 determines the height and width; the user device 122 may then determine normalized x- and y-coordinates by dividing the x-coordinate 306 by the width (as in equation (2)) and dividing the y-coordinate by the height (as in equation (1)) and send the normalized coordinates to the autonomously motile device 110. For example, if the height 304 is 768 pixels and the y-coordinate 308 is 384 (wherein, as described above, the y-coordinate 308 is the number of pixels from the bottom of the screen 312 to the point of the touch input), the normalized y-coordinate is 384 divided by 768 or 0.5 (e.g., the touch input was received at a point 50% of the way from the bottom of the screen 312). Similarly, if the width 302 of the screen 312 is 1024 pixels, and the x-coordinate 306 is 768 (wherein, as described above, the x-coordinate 306 is the number of pixels from the left side of the screen 312 to the point of the touch input), the normalized x-coordinate is 0.5 (e.g., the touch input was received at a point 75% of the way across the screen 312 as measured from the left side of the screen). As described in equation (2), the normalized x-coordinate may be determined by dividing half of the difference of the width 302 and the x-coordinate 306 by half of the width 302. A direction directly ahead of the device 110 may have a normalized x-coordinate of 0; the sign of the normalized x-coordinate may determine whether the direction is left or right of zero.

The autonomously motile device 110 may then carry out the rest of the computations described in equations (1) and (2) (e.g., the portions involving the maximum travel distance, minimum view distance, and horizontal field of view) using the normalized coordinates. In other embodiments, the user device 122 and/or system 120 compute the entirety of the direction and/or distance computations described by equations (1) and (2) and send the resultant distance and direction to the autonomously motile device 110, which may then determine the destination. The user device 122 and/or system 120 may still further determine the destination and send it to the user device 122 and/or system 120, which may then travel to the destination.

In various embodiments, the determined distance may be further modified by sensing a pressure of the touch gesture on the screen 312, which may include sensors capable of determining a pressure associated with the touch gesture, such as piezoelectric sensors that change a property, such as a resistance or voltage, proportionally in accordance with an amount of pressure. An average pressure may leave the distance unaffected; a pressure less than the average pressure may decrease the distance (by, for example, 50%); and a pressure greater than the average pressure may increase the distance (by, for example, 50%). The distance may be modified by varying percentages for variations in pressure. A length of time of the touch gesture may similarly be used to modify the distance, in which short times lessen the distance and long times increase the distance.

Referring to equation (2), the direction of movement may be determined by finding the difference between half of the screen width 302 and the x-coordinate 306, dividing the result by half the screen width 302, and multiplying that result by half of the horizontal field of view 402. The direction of movement may be expressed in a number of degrees, radians, or other such measurement relative to the device 110. The orientation of the degrees may be such that a direction directly in front of the device 110 is 0° and a direction directly behind the device is +/−180°; directions to the right of the device may be expressed as positive degrees and directions to the left of the device may be expressed as negative degrees. Any method of expressing directions relative to the device 110 is, however, within the scope of the present disclosure.

The results of equations (1) and (2) may be modified in accordance with properties of lenses of the camera(s) 114/116/212. The lenses may, for example, bend light in a nonlinear fashion for different areas of the lenses. For example, a difference in distance of 100 pixels in the center of the display 312 may correspond to a distance of 0.5 meters or 5 degrees, while a difference in distance of 100 pixels at the edge of the display 312 may correspond to a distance of 1.0 meters or 10 degrees. The computation of the distance and/or direction may therefore be modified to account for these nonlinearities. In some embodiments, the device 110 determines which camera, or which type of camera, was used to capture the image data and determines corresponding lens data stored in a computer memory. The lens data may be, for example, a 2×2 matrix of values, wherein each value specifies the amount of nonlinearity for each pixel or group of pixels. The device 110 may instead or in addition determine this lens data by calibrating the lens. This calibration may include moving the camera 114/116/ 212 such that a point represented in the image data, such as a light source, travels across the display 312. The device 110 may determine the lens data by determining changes in the speed of this travelling.

FIGS. 5A-5E illustrate different scenarios in which the autonomously motile device 110 may receive an indication from a user device 122 (and/or a display 214 of the autonomously motile device 110 itself) of an (x,y) coordinate corresponding to a user input requesting movement to a destination for the autonomously motile device 110 in the environment 102. The indication may further include a time of the user input. Referring first to FIG. 5A, the autonomously motile device 110 may receive the indication of the user input to move to a requested destination 502a when both the autonomously motile device 110 is stationary (e.g., not moving) and when the camera 114/116/212 is oriented such that it faces the same direction as the autonomously motile device 110 (e.g., both the autonomously motile device 110 and the camera 114/116/212 face 0°). The fixed camera(s) 212 may, in fact, always face the same direction as the device 110. In these embodiments, the autonomously motile device 110 may determine the distance and direction of movement in accordance with the equations (1), (2) described above and then move the distance in the direction. As described in greater detail below, if the device 110 encounters an obstacle, such as a wall, item of furniture, or person, during the movement, it may cease further movement. Similarly, the device 110 may shorten its determined distance and/or change the direction if a map of the environment indicates an obstacle in the direction and distance. As also described herein, the device 110 may instead or in addition determine a destination associated with the direction and distance and travel to the destination while avoiding obstacles.

Referring to FIG. 5B, the autonomously motile device 110 may receive the indication to move to a requested destination 502b while the autonomously motile device 110 is stationary (e.g., not moving) but while the camera 114/116 is oriented such that it does not the same direction as the autonomously motile device 110 (e.g., the autonomously motile device 110 faces 0° and the and the camera 114/116 faces some other direction than 0°). For example, as shown in FIG. 5B, the device 110 is facing 0° and the camera 114/116 is facing approximately −45°. In these embodiments, the autonomously motile device 110 may determine the orientation of the camera 114/116 relative to the device 110 (here, approximately −45° and modify the result of equation (2) based thereon (e.g., add or subtract the orientation from the result) before moving the distance in the modified direction.

Referring to FIG. 5C, the autonomously motile device 110 may receive the indication to move to a requested destination 502c while the autonomously motile device 110 is stationary (e.g., not moving) but while the camera 114/116 is moving with a motion 504c such that an (x,y) coordinate represented by the indication would correspond to a first position 506a prior to the motion 504c and a second position 508c after the motion 504c. As described herein, due to a possible delay in receiving the indication and computing the direction and distance, image data from the camera 114/116 received at a time after the time of the user input may represent a different view of the environment than that image data received at a time corresponding to the time of the user input. Using the position of the camera before or after the time of the user input corresponding to the requested destination 502c (e.g., the position before 506c or after 508c, or elsewhere in between), may result in determination of a direction and distance that do not correspond to the requested destination 502c.

The autonomously motile device 110 may therefore determine and store data representing the position of the device 110 and the orientation of the camera 114/116 (as shown in greater detail with respect to FIG. 6). For example, for each unit of time, the device 110 may store the (x,y) coordinates of the device 110, the orientation of the device 110, the orientation of the device 110 with respect to the environment 102, and/or the orientation of the camera 114/116 (e.g., its pan, tilt, and/or pedestal orientation expressed in degrees). The units of time may be, for example, 1 millisecond, 10 milliseconds, or 100 milliseconds; the units of time may correspond to a frame rate of the image data (e.g., one set of position/orientation data is stored for each one or more frames). The autonomously motile device 110 may then determine a time corresponding to the time of the user input and determine the position and/or orientation of the device 110 at that time. This determined position and/or orientation may be used, as described above, to modify the result of equation (2).

Referring to FIG. 5D, in other embodiments, the autonomously motile device 110 receives the indication while the position of the device 110 is changing (e.g., the device 110 is undergoing linear and/or angular motion) but the orientation of the camera 114/116 is not changing (but may be facing a direction different from that of the device 110). The autonomously motile device 110 may similarly determine a position (which may include an orientation) of the device 110 at the time of the user input and use this position when determining the distance and direction. The device 110 may similarly account for the orientation of the camera 114/116. Referring to FIG. 5E, when the user input is received, both the device 110 may be in motion 510e and the camera may be in motion 504e. The device 110 may similarly determine the position of the device 110 and the orientation of the camera 114/116 at the time of the user input.

FIG. 6 illustrates an exemplary data structure 600 for storing historical position and/or orientation data. The data structure may be stored in a computer memory of the device 110. For each unit of time (whether wall clock time, frame number, and/or other unit or measurement of time), the device 110 may determine and store the position of the device 110 in the environment at the time/frame at which the view of the environment 102 is displayed on the device 122, which may include (x,y,z) coordinates and the orientation of the device 110, and, for one or more cameras, the degree of pan, tilt, and/or pedestal for each camera. The device 110 may determine a time of a user input, such as a touch gesture, from data received from a user device 122, and may use this time to determine which of the position/orientation data to use for the above distance/direction determinations.

Figure 7B:
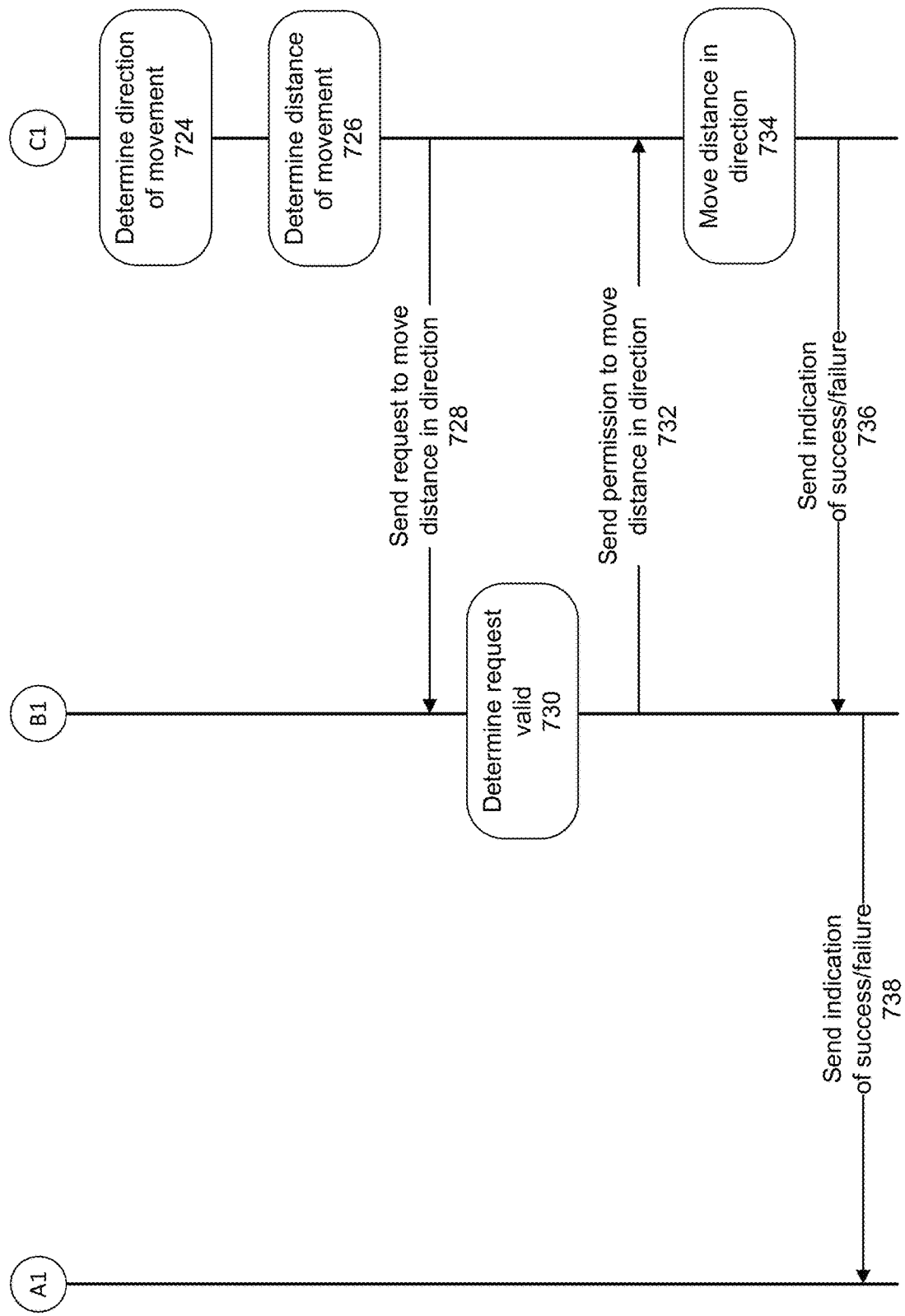

FIGS. 7A and 7B illustrate a method for remote control of an autonomously motile device 110 in accordance with embodiments of the present disclosure. The figures illustrate a screen manager 702 for managing a display of the user device 122 and/or autonomously motile device 110, a state manager 704 for managing a state (e.g., position and/or camera orientation) of an autonomously motile device 110, and a movement manager 706 for controlling movement of an autonomously motile device 110. The present disclosure is not, however, limited to only these components, and the various steps described herein may be performed by more, fewer, and/or different components. Each of the components (and the steps they carry out) may be disposed on the autonomously motile device 110, user device 122, and or server 120.

In a first step, the screen manager 702 detects (710) a user input, such as a touch gesture, and determines (712) (x,y) screen/window coordinates and a time corresponding to the user input. The screen manager 702 sends (714), to the state manager 704, the coordinates and time. The state manager 704 determines (716) which camera 114/116/212 was used to capture image data sent to the screen manager 702 for output on a display. The state manager 704 determines (718) a position of the autonomously motile device 110 at the time and determines (720) the orientation of the camera at the time. The state manager 704 then sends (722) the (x,y) coordinates, the time, the identity of the camera, the position, and the orientation to the movement manager 706.

The movement manager 706 may determine (724) the direction of the movement and may determine (726) the distance of the movement using this information as described herein. The movement manager 706 may then send (728) a request to move to the state manager 704), which may determine (730) that the request is valid if, for example, an amount of time since the user input is less than a threshold time or if an additional user input has not been received. If the request is valid, the state manager 704 may send (732) a grant of permission to the movement manager 706, which may then cause the device 110 to move (734) the distance in the direction. The movement manager 706 may send (736) an indication of success or failure to the state manager 704, which may in turn send (738) the indication to the screen manager 702.

Figure 8A:
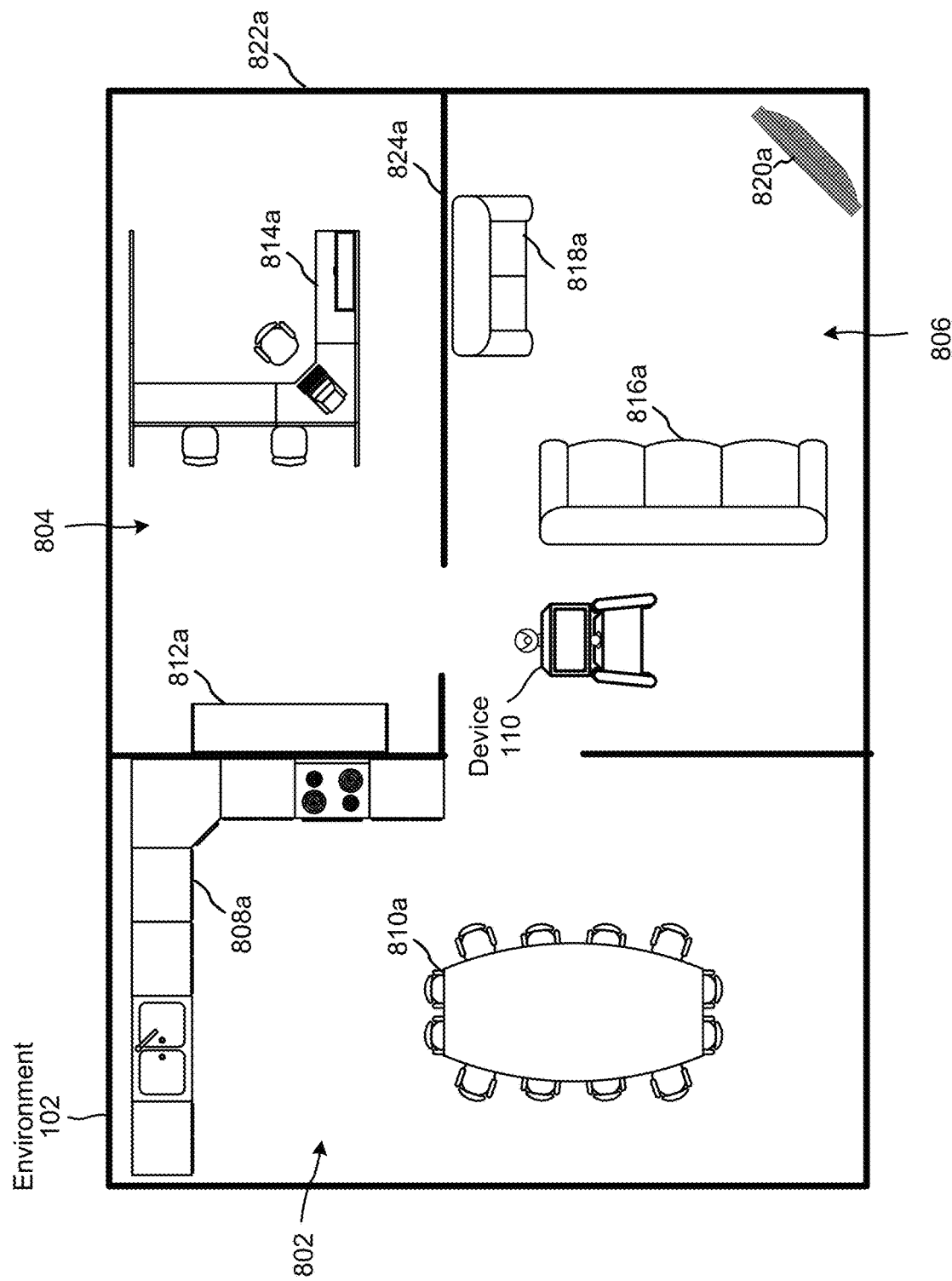

FIGS. 8A and 8B illustrate a representation of an environment 102 and a corresponding map of an autonomously motile device 110 according to embodiments of the present disclosure. Referring first to FIG. 8A, an example environment 102 includes three rooms 802, 804, 806. A first room 802 includes a kitchen countertop 808a and a table and chairs 810a. A second room 804a includes bookshelves 812a and a desk 814a. A third room 806a includes a sofa 816a, a loveseat 818a, and a wall-mounted television 820a. In this example environment 102, some objects (such as sofa 816a) extend from the floor of the environment 102 to a point between the ceiling and the floor; some objects (such as the television 820a) do not touch the floor; and other objects (such as bookshelves 812a) extend from floor to ceiling. The environment is bordered by exterior walls 822a and may include one or more interior walls 824a. The device 110 is capable of movement, as disclosed herein, within the environment 102. Environments 102, however, having any number of rooms and/or any types of objects are within the scope of the present disclosure.

FIG. 8B illustrates a map 826 of the environment 102. The device 110 may generate the map 826 or may receive the map 826 from the system 120. The map 826 includes data representing the position 822b of exterior walls 822a and data representing the position 824b of interior walls 824a. The map data may be a set of (x,y) coordinates that indicate the positions 822b, 824b of the walls 822a, 824a with respect to a (0,0) origin point, such as a bottom-left point of the map 826. For example, if an exterior wall 822a extends from the (0,0) origin point to a point 10 meters to the right, the map data may include the coordinates (0,0)-(10,0).

The map 824 may further include data representing the positions 808b, 810b, 812b, 814b, 816b, 818b of the objects 808a, 810a, 812a, 814a, 816a, 818a, 820a. The data representing the positions 808b, 810b, 812b, 814b, 816b, 818b, 820b may similarly be a set of further (x,y) coordinates that represent the position and size of each object 808a, 810a, 812a, 814a, 816a, 818a, 820a in the environment 102 with respect to the (0,0) origin point. For example, if the sofa 816 has dimensions of 1 meter by 0.5 meters, and if it is positioned such that its lower-left corner is disposed at the grid point (10,1), the data representing its position may be (10,1)×(10.5, 2), denoting its lower-left corner and upper-right corner. Objects having more complicated shapes (with more than four sides) may be represented by additional sets of (x,y) coordinates, such that each pair of (x,y) coordinates defines a side of the object. Objects having curved or otherwise more complicated sides may be represented by data defining the curve, such as parameters defining an arc segment, or may be estimated as a set of straight lines.

The device 110 and/or system 120 may determine the map 824 by processing input data, such as image data received from the camera 114 or infrared data received from one or more cameras 212. The device 110 may move within the environment 102 while it captures the image data. In some embodiments, device 110 and/or system 120 processes the image data using image-processing techniques to determine objects therein and then determines the position data based thereon. For example, if the device 110 captures image data that includes a representation of the sofa 816a, the device 110 and/or system 120 may determine, based on a likely size of the sofa 816a, how far the sofa 816 is from the device 110 and base the (x,y) coordinates of the representation of the sofa 816b thereon. In other embodiments, the device 110 and/or system 120 uses the multiple cameras to capture binocular images of the environment 102 and, based on a known distance between the multiple cameras, determines the distance between the device 110 and an object depicted in the binocular images. Any method of determining the coordinates of the positions 822b, 824b of the walls 822a, 824a and the positions 808b, 810b, 812b, 814b, 816b, 818b, 820b of the objects 808a, 810a, 812a, 814a, 816a, 818a, 820a is within the scope of the present disclosure.

The map data may further include a grid made up of grid units 828. If the map data does not include the grid, the device 110 may create the grid. Each grid unit may have dimensions of any size, such as 100 centimeters length and width. The grid units need not be square and need not be all the same size; they may be, for example hexagonal. The system 120 and/or device 110 may create the grid by beginning at the (0,0) origin point and placing grid tiles adjacent in the positive x- and y-dimensions. In other embodiments, the system 120 and/or device 110 may determine the length and width of each grid unit by determining the length and width of the map 826 and/or rooms 802, 804, 806 and dividing by an integer, such as ten, so that no fractionally-sized grid units 828 are needed to fully populate the map 826 with the grid units 828.

When the device 110 determines a direction and distance of movement associated with a user input, as described herein, it may determine its position on the map 826 and plot the distance in the direction. If an obstruction intersects with the plotted path, the device 110 may truncate its path to avoid hitting the obstruction, alter the path around the obstruction, or refuse to move altogether. The device 110 may send an indication of failure to the user device 122. As also described herein, the device 110 may instead or in addition determine a destination associated with the direction and distance and travel to the destination; the travel may include avoidance of one or more obstacles.

FIGS. 9A-9D illustrate an autonomously motile device 110 capable of changing a position of a moveable component. In these figures, the moveable component is a mast 112 having a camera 116 disposed thereon. Referring first to FIG. 9A, the mast 112 and camera 116 may be hidden behind a mast housing 906, which may be flush with a top surface of a display support 904. The display support 904 may be in mechanical contact with a display housing 902; this mechanical contact may include a hinging mechanism that allows the display housing to pan, tilt, or rotate with respect to the device 110. The display housing 902 may house the display 214.

FIGS. 9B, 9C, and 9D illustrate that the mast 112 may be disposed in different positions relative to the autonomously motile device 110. The positions may be a set of discrete positions or may be a spectrum of positions between a minimum height and a maximum height. Referring first to FIG. 9B, the autonomously motile device 110 may cause the mast 112 to extend from the mast housing 906 to a first position. In this first position, the camera 116 may be disposed at a first height above the mast housing 906; this first height may be, for example, 20 centimeters above the mast housing 906. The autonomously motile device 110 may cause the mast 112 to move using an electrically controllable motor, such as a stepper motor. The autonomously motile device 110 may determine that the mast 112 is in the first position based on a length of time of operation of the motor (or other such actuator), by receiving feedback from a sensor, or both.

Referring to FIG. 9C, the autonomously motile device 110 may continue to extend the mast 112 until the camera 116 is in a second position relative to the mast housing 906. This second position may be, for example, 100 centimeters above the mast housing 906. The autonomously motile device 110 may similarly cause the mast 112 to move using an electrically controllable motor, and may similarly determine that the camera 116 is in the second position using the timer and/or sensor.

Referring to FIG. 9D, the autonomously motile device 110 may continue to extend the mast 112 until the camera 116 is in a third position relative to the mast housing 906. This third position may be, for example, 200 centimeters above the mast housing 906. The autonomously motile device 110 may similarly cause the mast 112 to move using an electrically controllable motor, and may similarly determine that the camera 116 is in the third position using the timer and/or sensor. In this example, the mast 112 may have two components: a first component mast A 112a having a diameter similar to that of the mast 112 described above with reference to FIGS. 9B and 9C, and a second component mast B 112b having a diameter greater than that of the mast 112 described above with reference to FIGS. 9B and 9C. The mast 112 may include additional components of even greater diameter to permit the mast 112 to extend still further.

FIGS. 10A-10C illustrate an autonomously motile device 110 capable of changing a physical position of another moveable component. In these embodiments, the moveable component is the display housing 902, on which are mounted cameras 114, as shown in FIG. 10A. As shown in FIG. 10B, the device 110 may cause a pan (e.g., rotation) 1002 of the cameras 114; the rotation 1002 may occur in either of two directions (e.g., clockwise or counterclockwise). The device 110 may cause the rotation using a motor such as a stepper motor or other actuator and may determine an amount of rotation based on a duration of the rotation and/or a sensor. Referring to FIG. 5C, the device 110 may further cause a tilt 1004 of the cameras 114, which may be similarly be performed using an actuator and may be measured using a timer and/or sensor.

FIG. 11 is a block diagram conceptually illustrating an autonomously motile device 110 or user device 122 in accordance with the present disclosure. FIG. 12 is a block diagram conceptually illustrating example components of a system 120, such as remote server, which may assist with creating a map of an environment 102, ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

FIG. 11A is a block diagram of some components of the autonomously motile device 110 such as network interfaces 1119, sensors 1154, and output devices, according to some implementations. The components illustrated here are provided by way of illustration and not necessarily as a limitation. For example, the autonomously motile device 110 may utilize a subset of the particular network interfaces 1119, output devices, or sensors 1154 depicted here, or may utilize components not pictured. One or more of the sensors 1154, output devices, or a combination thereof may be included on a moveable component that may be panned, tilted, rotated, or any combination thereof with respect to a chassis of the autonomously motile device 110.

The autonomously motile device 110 may include input/output device interfaces 1102 that connect to a variety of components such as an audio output component such as a speaker 1112, a wired headset or a wireless headset (not illustrated), or other component capable of outputting audio. The autonomously motile device 110 may also include an audio capture component. The audio capture component may be, for example, a microphone 1120 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 114/116/212, light, button, actuator, and/or sensor 1154.

The network interfaces 1119 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 102 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1102/1202) may also include and/or communicate with communication components (such as network interface(s) 1119) that allow data to be exchanged between devices such as different physical servers in a collection of servers or other components.

The components of the device(s) 110 and/or the system(s) 120 may include their own dedicated processors, memory, and/or storage. Alternatively, one or more of the components of the device(s) 110 and/or the system(s) 120 may utilize the I/O interfaces (1102/1202), processor(s) (1104/1204), memory (1106/1206), and/or storage (1108/1208) of the device(s) 110 and/or the system(s) 120, respectively.

FIG. 11B illustrates components that may be stored in a memory of an autonomously motile device according to embodiments of the present disclosure. Although illustrated as included in memory 1106, the components (or portions thereof) may also be included in hardware and/or firmware. FIG. 11C illustrates data that may be stored in a storage of an autonomously motile device according to embodiments of the present disclosure. Although illustrated as stored in storage 1108, the data may be stored in memory 1106 or in another component. FIG. 11D illustrates sensors that may be included as part of an autonomously motile device according to embodiments of the present disclosure.

A position determination component 1132 determines position data 1144 indicative of a position 284 of the feature 286 in the environment 102. In one implementation the position 284 may be expressed as a set of coordinates with respect to the first camera 114a/116a/212a. The position determination component 1132 may use a direct linear transformation triangulation process to determine the position 284 of a feature 286 in the environment 102 based on the difference in apparent location of that feature 286 in two images acquired by two cameras 114/116/212 separated by a known distance.

A movement determination module 1133 determines if the feature 286 is stationary or non-stationary. First position data 1144a indicative of a first position 284a of a feature 286 depicted in the first pair of images 282a acquired at time $t_1$ is determined by the position determination component 1132. Second position data 1144b of the same feature 286 indicative of a second position 284b of the same feature 286 as depicted in the second pair of images 282b acquired at time $t_2$ is determined as well. Similar determinations made for data relative to first position 284a and second position 284b may also be made for third position 284c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature 286 at the second time. The predicted position is compared to the second position data 1144b to determine if the feature is stationary or non-stationary. If the predicted position is less than a threshold value from the second position 284b in the second position data 1144b, then the feature 286 is deemed to be stationary.

Features 286 that have been deemed to be stationary may be included in the second feature data. The second feature data may thus exclude non-stationary features 286 and comprise a subset of the first feature data 1148 which comprises stationary features 286.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features 286 in pairs of images 282. The SLAM component 1134 may also provide trajectory data indicative of the trajectory 280 that is based on a time series of pose data 1145 from the SLAM component 1134.

Other information, such as depth data from a depth sensor, the position data 1144 associated with the features 286 in the second feature data, and so forth, may be used to determine the presence of obstacles 283 in the environment 102 as represented by an occupancy map as represented by occupancy map data 1149.

The occupancy map data 1149 may comprise data that indicates the location of one or more obstacles 283, such as a table, wall, stairwell, and so forth. In some implementations, the occupancy map data 1149 may comprise a plurality of cells with each cell of the plurality of cells representing a particular area in the environment 102. Data, such as occupancy values, may be stored that indicates whether an area of the environment 102 associated with the cell is unobserved, occupied by an obstacle 283, or is unoccupied. An obstacle 283 may comprise an object or feature that prevents or impairs traversal by the autonomously motile device 110. For example, an obstacle 283 may comprise a wall, stairwell, and so forth.

The occupancy map data 1149 may be manually or automatically determined. For example, during a learning phase the user may take the autonomously motile device 110 on a tour of the environment 102, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 102.

Modules described herein, such as the mapping component 1130, may provide various processing functions such as de-noising, filtering, and so forth. Processing of sensor data 1147, such as image data from a camera 114/116/212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1147. In still another implementation, functions such as those in the Machine Vision Toolbox (MVTB) available using MAT-LAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1147 or other data. For example, the ANN may be trained using a supervised learning algorithm such that object identifiers are associated with images of particular objects within training images provided to the ANN. Once trained, the ANN may be provided with the sensor data 1147 and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 283 as indicated by the occupancy map data 1149.

An autonomous navigation component 1136 provides the autonomously motile device 110 with the ability to navigate within the environment 102 without real-time human interaction. The autonomous navigation component 1136 may implement, or operate in conjunction with, the mapping component 1130 to determine one or more of the occupancy map data 1149, the navigation map data 1150, or other representations of the environment 102.

The autonomously motile device 110 autonomous navigation component 1136 may generate path plan data 1152 that is indicative of a path through the environment 102 from the current location to a destination location. The autonomously motile device 110 may then begin moving along the path.

While moving along the path, the autonomously motile device 110 may assess the environment 102 and update or change the path as appropriate. For example, if an obstacle 283 appears in the path, the mapping component 1130 may determine the presence of the obstacle 283 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 102 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1119 to connect to a network 199. For example, the network 199 may comprise a wireless local area network that in turn is connected to a wide area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 120 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 120 for further processing. The servers 120 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth. In some implementations the other devices may include other AMDs 110, vehicles, and so forth.

In other implementations, other types of autonomous mobile devices (AMD) may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 1104 may use data from the clock to associate a particular time with an action, sensor data 1147, and so forth.

The autonomously motile device 110 may include one or more hardware processors 1104 (processors) configured to execute one or more stored instructions. The processors 1104 may comprise one or more cores. The processors 1104 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1102, network interfaces 1119, and so forth. The communication component 1140 enable the autonomously motile device 110, or components thereof, to communicate with other devices or components. The communication component 1140 may include one or more I/O interfaces 1102. The I/O interfaces 1102 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1102 may couple to one or more I/O devices. The I/O devices may include input devices such as one or more of a sensor 1154, keyboard, mouse, scanner, and so forth. The I/O devices may also include output devices such as one or more of a motor, light, speaker 1112, display 214, projector, printer, and so forth. In some embodiments, the I/O devices may be physically incorporated with the autonomously motile device 110 or may be externally placed.

The I/O interface(s) 1102 may be configured to provide communications between the autonomously motile device 110 and other devices such as other AMDs 110, docking stations, routers, access points, and so forth, for example through antenna 1110 and/or other component. The I/O interface(s) 1102 may include devices configured to couple to personal area networks (PANs), local area networks (LANs), wireless local area networks (WLANS), wide area networks (WANs), and so forth. For example, the network interfaces 1119 may include devices compatible with Ethernet, Wi-Fi, Bluetooth, Bluetooth Low Energy, ZigBee, and so forth. The autonomously motile device 110 may also include one or more busses 1124 or other internal communications hardware or software that allow for the transfer of data between the various modules and components of the autonomously motile device 110.

As shown in FIG. 11A, the autonomously motile device 110 includes one or more memories 1106. The memory 1106 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1106 provides storage of computer-readable instructions, data structures, program modules, and other data for the operation of the autonomously motile device 110. A few example functional modules are shown stored in the memory 1106, although the same functionality may alternatively be implemented in hardware, firmware, or as a system on a chip (SoC).

The memory 1106 may include at least one operating system (OS) component 1139. The OS component 1139 is configured to manage hardware resource devices such as the I/O interfaces 1102, the I/O devices, the communication component 1140, and provide various services to applications or modules executing on the processors 1104. The OS component 1139 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 1106, or elsewhere may be a data store 1108 and one or more of the following modules. These modules may be executed as foreground applications, background tasks, daemons, and so forth. The data store 1108 may use a flat file, database, linked list, tree, executable code, script, or other data structure to store information. In some implementations, the data store 1108 or a portion of the data store 1108 may be distributed across one or more other devices including other AMDs 110, servers 120, network attached storage devices, and so forth.

A communication component 1140 may be configured to establish communication with other devices, such as other AMDs 110, an external server 120, a docking station, and so forth. The communications may be authenticated, encrypted, and so forth.

Other modules within the memory 1106 may include a safety component 1129, the mapping component 1130, the navigation map component 1135, the autonomous navigation component 1136, the one or more components 1141, a speech processing component 1137, or other components. The components may access data stored within the data store 1108, including safety tolerance data 1146, sensor data 1147, inflation parameters, other data, and so forth.

The safety component 1129 may access the safety tolerance data 1146 to determine within what tolerances the autonomously motile device 110 may operate safely within the environment 102. For example, the safety component 1129 may be configured to stop the autonomously motile device 110 from moving when an extensible mast of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1154 detects an object has approached to less than the minimum distance, all movement of the autonomously motile device 110 may be stopped. Similarly, when a sensor 1154 detects that a path of the device 110 includes a "cliff" (e.g., the top of a staircase), all movement of the autonomously motile device 110 may be stopped Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1154, precision and accuracy of the sensor data 1147, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 283 indicated by the occupancy map data 1149. One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN.

Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 120 for speech processing. The audio data corresponding to audio obtained by the microphone may be processed locally on one or more of the processors 1104, sent to a server 120 for routing to a recipient device or may be sent to the server 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 120, and so forth.

The speech processing component 1137 may include or access an automated speech recognition (ASR) module. The ASR module may accept as input raw audio data 1143, audio feature vectors, or other sensor data 1147 and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 102 without real-time human interaction. The autonomous navigation component 1136 may implement, or operate in conjunction with, the mapping component 1130 to determine the occupancy map data 1149, the navigation map data 1150, or other representation of the environment 102. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 102 and determine path plan data 1152 that describes the path to a destination location such as the docking station.

The autonomous navigation component 1136 may utilize various techniques during processing of sensor data 1147. For example, image data 1142 obtained from cameras 114/116/212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1104, in response to a command received from one or more communication interfaces, as determined from the sensor data 1147, and so forth. For example, an external server 120 may send a command that is received using the network interface 1119. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction.

The autonomously motile device 110 may connect to the network 199 using one or more of the network interfaces 1119. In some implementations, one or more of the modules or other functions described here may execute on the processors 1104 of the autonomously motile device 110, on the server 120, or a combination thereof. For example, one or more servers 120 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1108 may store the other data as well. For example, localization settings may indicate local preferences such as language, user identifier data may be stored that allows for identification of a particular user, and so forth.

Figure 11D:
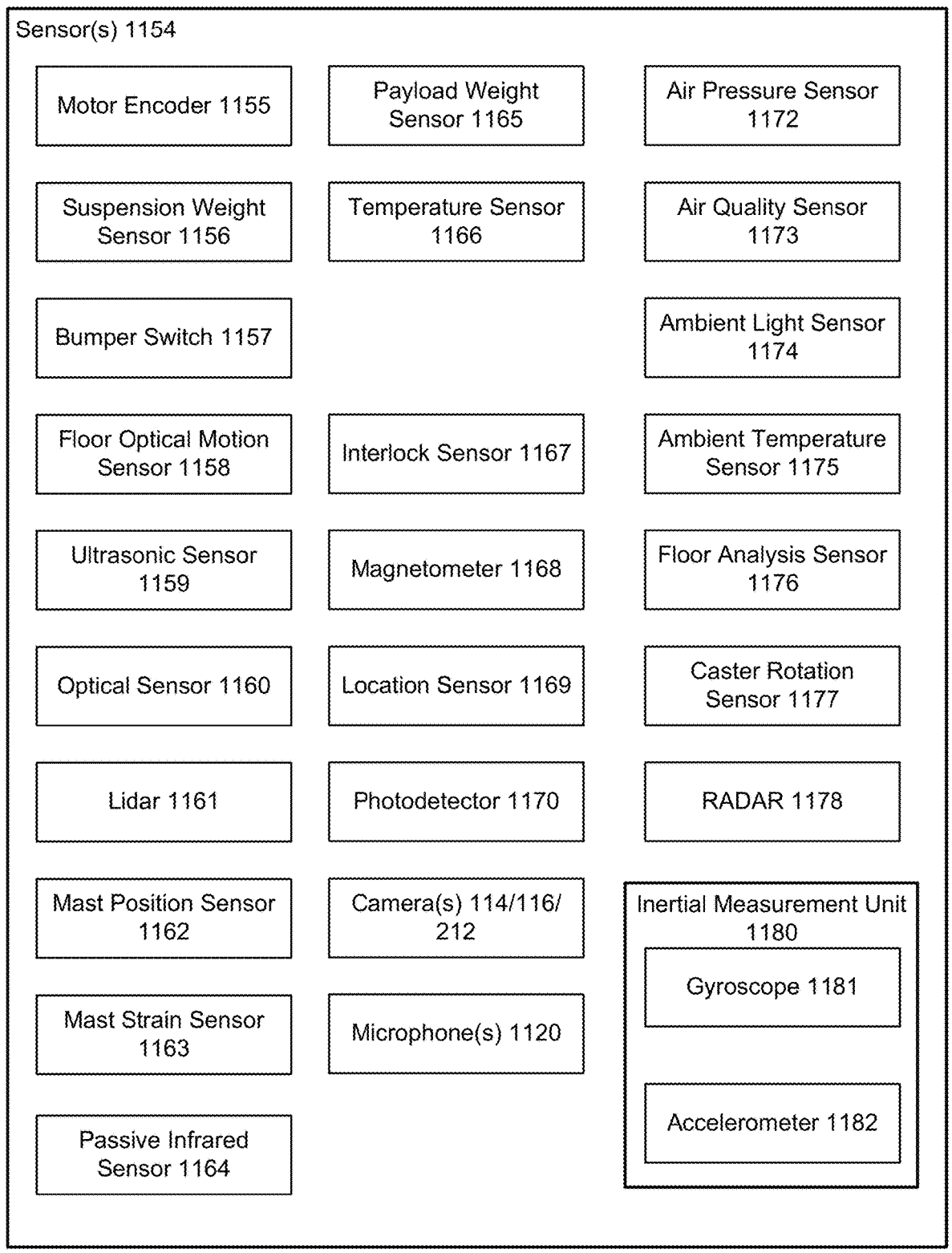
FIG. 11D illustrates sensors that may be included as part of an autonomously motile device according to embodiments of the present disclosure.

As shown in FIG. 11D, the autonomously motile device 110 may include one or more of the following sensors 1154. The sensors 1154 depicted here are provided by way of illustration and not necessarily as a limitation. It is understood that other sensors 1154 may be included or utilized by the autonomously motile device 110, while some sensors 1154 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 1147 obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor (FOMS) 1158 provides information indicative of motion of the autonomously motile device 110 relative to the floor or other surface underneath the autonomously motile device 110. In one implementation, the FOMS 1158 may comprise a light source such as light-emitting diode (LED), an array of photodiodes, and so forth. In some implementations, the FOMS 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 1158 may provide other information, such as data indicative of a pattern present on the floor, composition of the floor, color of the floor, and so forth. For example, the FOMS 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1154 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 1147 indicative of one or more of a presence or absence of an object, a distance to the object, or characteristics of the object. The optical sensor 1160 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field of view (FOV) that is directed in a different way. For example, the optical sensor 1160 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 1154 such as an image sensor or camera 114/116/212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 1147 indicative of the distance to an object in order to prevent a collision with that object.

Multiple optical sensors 1160 may be operated such that their FOV overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1147 may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 102.

The autonomously motile device 110 may include a mast. A mast position sensor 1162 provides information indicative of a position of the mast of the autonomously motile device 110. For example, the mast position sensor 1162 may comprise limit switches associated with the mast extension mechanism that indicate whether the mast is at an extended or retracted position. In other implementations, the mast position sensor 1162 may comprise an optical code on at least a portion of the mast that is then interrogated by an optical emitter and a photodetector to determine the distance to which the mast is extended. In another implementation, the mast position sensor 1162 may comprise an encoder wheel that is attached to a mast motor that is used to raise or lower the mast. The mast position sensor 1162 may provide data to the safety component 1129. For example, if the autonomously motile device 110 is preparing to move, data from the mast position sensor 1162 may be checked to determine if the mast is retracted, and if not, the mast may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 1147 obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 1147 that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall-Effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 1147 indicative of impinging light. For example, the photodetector 1170 may provide data indicative of a color, intensity, duration, and so forth.

A camera 114/116/212 generates sensor data 1147 indicative of one or more images. The camera 114/116/212 may be configured to detect light in one or more wavelengths including, but not limited to, terahertz, infrared, visible, ultraviolet, and so forth. For example, an infrared camera 114/116/212 may be sensitive to wavelengths between approximately 700 nanometers and 1 millimeter. The camera 114/116/212 may comprise charge coupled devices (CCD), complementary metal oxide semiconductor (CMOS) devices, microbolometers, and so forth. The autonomously motile device 110 may use image data acquired by the camera 114/116/212 for object recognition, navigation, collision avoidance, user communication, and so forth. For example, a pair of cameras 114/116/212 sensitive to infrared light may be mounted on the front of the autonomously motile device 110 to provide binocular stereo vision, with the sensor data 1147 comprising images being sent to the autonomous navigation component 1136. In another example, the camera 114/116/212 may comprise a 10 megapixel or greater camera that is used for videoconferencing or for acquiring pictures for the user.

The camera 114/116/212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time.

For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 114/116/212, particularly those associated with navigation or autonomous operation, may utilize a global shutter. In other implementations, the camera(s) 114/116/212 providing images for use by the autonomous navigation component 1136 may be acquired using a rolling shutter and subsequently may be processed to mitigate image artifacts.

One or more microphones 1120 may be configured to acquire information indicative of sound present in the environment 102. In some implementations, arrays of microphones 1120 may be used. These arrays may implement beamforming techniques to provide for directionality of gain. The autonomously motile device 110 may use the one or more microphones 1120 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 102 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 49° at a second time.

The sensors 1154 may include a radar 1178. The radar 1178 may be used to provide information as to a distance, lateral position, and so forth, to an object.

The sensors 1154 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 102 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light 258 may be used to emit photons. A speaker 1112 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 120 as described herein, are illustrative, and may be located as a stand-alone device or may be included, in whole or in part, as a component of a larger device or system.

Figure 13:
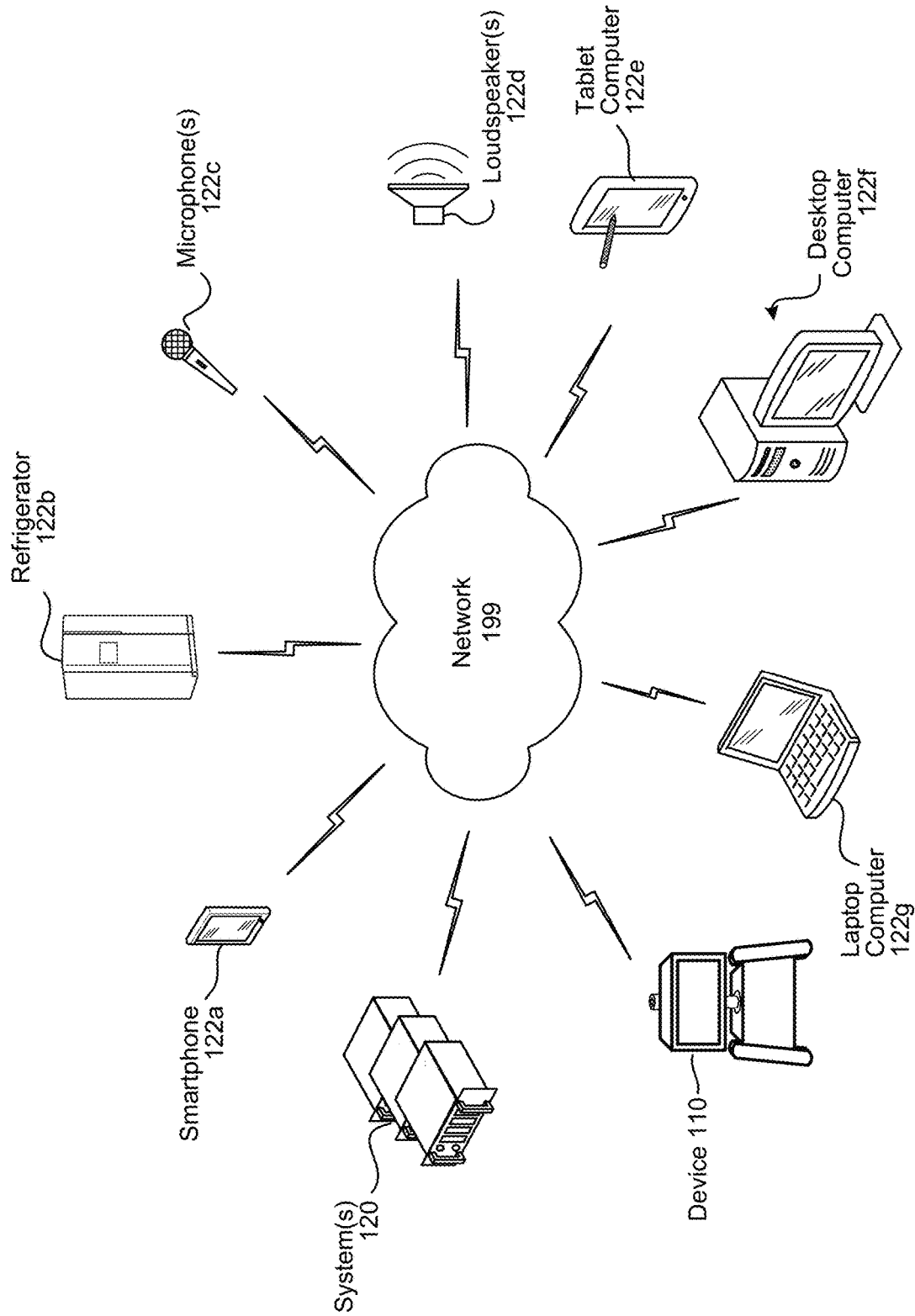
FIG. 13 illustrates a network including an autonomously motile device according to embodiments of the present disclosure.

As illustrated in FIG. 13 and as discussed herein, the autonomously motile device 110 may communicate, using the network 199, with the system 120 and/or a user device 122. The network(s) 199 may include a local or private network or may include a wide network such as the Internet. The devices may be connected to the network(s) 199 through either wired or wireless connections. Example user devices 122 include a cellular phone 122*a*, a refrigerator 122*b*, a microphone 122*c*, a loudspeaker 122*d*, a tablet computer 122*e*, a desktop computer 122*f*, and a laptop computer 122*g*, which may be connected to the network(s) 199 through a wireless service provider, over a Wi-Fi or cellular network connection, or the like. Other devices are included as network-connected support devices, such as the system(s) 120, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    displaying, on a screen of a user device, an image corresponding to image data received from an autonomously motile device, the image data representing a portion of a physical space;
    determining data representing an input at the screen of the user device, the input corresponding to an x-coordinate of the screen and a y-coordinate of the screen;
    determining a first ratio of the x-coordinate to a width of the screen;
    determining a horizontal field of view of a camera of the autonomously motile device;
    determining, based at least on the horizontal field of view and the first ratio, a travel direction of the autonomously motile device;
    determining a second ratio of the y-coordinate to a height of the screen;
    determining, based at least on the second ratio, a travel distance of the autonomously motile device;
    determining a first destination, in a physical space, corresponding to the travel direction and the travel distance; and
    causing the autonomously motile device to move to a location in the physical space corresponding to the first destination.

2. The computer-implemented method of claim 1, further comprising:
    determining a time of capture of image data displayed on the screen at a time of image data of the autonomously motile device corresponding to the input;
    determining a position of the autonomously motile device at the time;
    determining an orientation of a camera of the autonomously motile device at the time;
    determining, based on the first destination, the position, and the orientation, a second destination; and
    causing the autonomously motile device to move to the second destination.

3. The computer-implemented method of claim 1, further comprising:

determining, using a map of the physical space, that a path to the first destination intersects an obstruction; and at least one of:
shortening the travel distance, or
altering the path.

4. The computer-implemented method of claim 1, wherein determining the travel distance comprises:
determining, using the first ratio and the second ratio, a ray extending from a present position of the autonomously motile device; and
determining that the ray intersects with a representation of an obstacle or a representation of a floor in the physical space.

5. The computer-implemented method of claim 4, wherein determining the travel direction comprises:
determining a difference between the present position and a position of the autonomously motile device at a time of image data of the autonomously motile device corresponding to the input; and
determining the travel direction by modifying the second ratio based at least in part on the difference.

6. The computer-implemented method of claim 1, wherein determining the travel distance comprises:
determining that the travel distance is greater than a first distance, the first distance corresponding to a portion of the physical space proximate to the autonomously motile device and outside a field of view of the camera; and
determining that the travel distance is less than a second distance corresponding to a size of the physical space.

7. The computer-implemented method of claim 6, further comprising:
determining a height of the camera with respect to ground;
determining a lower limit of a vertical field of view of the camera; and
determining the first distance using the height and the lower limit.

8. The computer-implemented method of claim 1, further comprising:
determining, using a two-dimensional map of the physical space, that a path to the first destination intersects a first obstruction; or
determining, using a three-dimensional map of the physical space, that the path to the first destination intersects a second obstruction different from the first obstruction.

9. The computer-implemented method of claim 1, wherein determining the travel direction comprises:
determining a present orientation of the camera;
determining a time corresponding to image data of the autonomously motile device corresponding to the input; and
determining a difference between the present orientation and an orientation of the camera at the time.

10. The computer-implemented method of claim 1, further comprising:
determining a present time;
determining a time corresponding to the input; and
prior to causing the autonomously motile device to move to the first destination determining that a difference between the present time and the time is less than a threshold.

11. The computer-implemented method of claim 1, further comprising:
sending, from the user device to the autonomously motile device, the x-coordinate and y-coordinate, wherein determining the first ratio and determining the second ratio are performed by the autonomously motile device.

12. A system comprising:
at least one processor; and
at least one memory including instructions that, when executed by the at least one processor, cause the system to:
display, on a screen of a user device, an image corresponding to image data received from an autonomously motile device, the image data representing a portion of a physical space;
determine data representing an input at the screen of the user device, the input corresponding to an x-coordinate of the screen and a y-coordinate of the screen;
determine a first ratio of the x-coordinate to a width of the screen;
determine a horizontal field of view of a camera of the autonomously motile device;
determine, based at least on the horizontal field of view and the first ratio, a travel direction of the autonomously motile device;
determine a second ratio of the y-coordinate to a height of the screen;
determine, based at least on the second ratio, a travel distance of the autonomously motile device;
determine a first destination, in a physical space, corresponding to the travel direction and the travel distance; and
cause the autonomously motile device to move to a location in the physical space corresponding to the first destination.

13. The system of claim 12, wherein the at least one memory further comprises instructions that, when executed by the at least one processor, further cause the system to:
determine a time of capture of image data displayed on the screen at a time of image data of the autonomously motile device corresponding to the input;
determine, a position of the autonomously motile device at the time;
determine, an orientation of a camera of the autonomously motile device at the time;
determine, based on the first destination, the position, and the orientation, a second destination; and
cause the autonomously motile device to move to the second destination.

14. The system of claim 12, wherein the at least one memory further comprises instructions that determine the travel distance and that, when executed by the at least one processor, further cause the system to:
determine, using a map of the physical space, that a path to the first destination intersects an obstruction; and
at least one of:
shorten the travel distance, or
alter the path.

15. The system of claim 12, wherein the at least one memory further comprises instructions that determine the travel distance and that, when executed by the at least one processor, further cause the system to:
determine, using the first ratio and the second ratio, a ray extending from a present position of the autonomously motile device; and
determine that the ray intersects with a representation of an obstacle or a representation of a floor in the physical space.

16. The system of claim 15, wherein the at least one memory further comprises instructions that determine the travel direction and that, when executed by the at least one processor, further cause the system to:
- determine a difference between the present position and a position of the autonomously motile device at a time of image data of the autonomously motile device corresponding to the input; and
- determine the travel direction by modifying the second ratio based at least in part on the difference.

17. The system of claim 12, wherein the at least one memory further comprises instructions that determine the travel distance and that, when executed by the at least one processor, further cause the system to:
- determine that the travel distance is greater than a first distance, the first distance corresponding to a portion of the physical space proximate to the autonomously motile device and outside a field of view of the camera; and
- determine that the travel distance is less than a second distance corresponding to a size of the physical space.

18. The system of claim 17, wherein the at least one memory further comprises instructions that, when executed by the at least one processor, further cause the system to:
- determine a height of the camera with respect to ground;
- determine lower limit of a vertical field of view of the camera; and
- determine the first distance using the height and the lower limit.

19. The system of claim 12, wherein the at least one memory further comprises instructions that, when executed by the at least one processor, further cause the system to:
- determine, using a two-dimensional map of the physical space, that a path to the first destination intersects a first obstruction; or
- determine, using a three-dimensional map of the physical space, that the path to the first destination intersects a second obstruction different from the first obstruction.

20. The system of claim 12, wherein the at least one memory further comprises instructions that, when executed by the at least one processor, further cause the system to:
- send, from the user device to the autonomously motile device, the x-coordinate and y-coordinate,
- wherein the instructions that cause the system to determine the first ratio and determine the second ratio are executed by the autonomously motile device.

\* \* \* \* \*